United States Patent
Kusakabe et al.

(10) Patent No.: US 7,433,538 B2
(45) Date of Patent: Oct. 7, 2008

(54) IMAGE PROCESSING APPARATUS AND CONTROL METHOD THEREOF

(75) Inventors: Minoru Kusakabe, Kanagawa (JP); Nobutaka Miyake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 10/462,704

(22) Filed: Jun. 17, 2003

(65) Prior Publication Data
US 2005/0031223 A1 Feb. 10, 2005

(30) Foreign Application Priority Data
Jun. 28, 2002 (JP) ............... 2002-191283

(51) Int. Cl.
*G06K 9/40* (2006.01)
*H04N 5/00* (2006.01)
*H04N 1/38* (2006.01)

(52) U.S. Cl. ............... 382/275; 382/260; 348/606; 358/463

(58) Field of Classification Search ............... 382/275, 382/260–265, 254; 348/606–624; 358/1.9–3.31, 358/447, 461, 463
See application file for complete search history.

(56) References Cited

U.S. PATENT DOCUMENTS

| | | | | |
|---|---|---|---|---|
| 6,009,213 A | | 12/1999 | Miyake | 382/300 |
| 6,075,902 A | * | 6/2000 | Kojima | 382/260 |
| 6,621,595 B1 | * | 9/2003 | Fan et al. | 358/3.26 |
| 6,721,458 B1 | * | 4/2004 | Ancin | 382/261 |
| 6,771,835 B2 | * | 8/2004 | Han et al. | 382/260 |
| 6,882,754 B2 | | 4/2005 | Hayashi | 382/275 |
| 7,058,199 B1 | * | 6/2006 | Au et al. | 382/100 |
| 7,064,868 B2 | * | 6/2006 | Kawano | 358/2.1 |
| 2001/0033387 A1 | * | 10/2001 | Nogiwa et al. | 358/1.9 |
| 2002/0030797 A1 | * | 3/2002 | Enomoto | 355/18 |
| 2002/0076117 A1 | * | 6/2002 | Allred et al. | 382/261 |
| 2002/0145610 A1 | * | 10/2002 | Barilovits et al. | 345/538 |
| 2003/0063144 A1 | | 4/2003 | Kusakabe et al. | 347/15 |

FOREIGN PATENT DOCUMENTS

| | | |
|---|---|---|
| JP | 7-203210 | 8/1995 |
| JP | 09-326930 A | 12/1997 |
| JP | 10-200710 A | 7/1998 |
| JP | 2000-22939 A | 1/2000 |
| JP | 2001-177731 A | 6/2001 |
| JP | 2001-186366 A | 7/2001 |
| JP | 2001-298619 A | 10/2001 |
| JP | 2002-10108 | 1/2002 |

OTHER PUBLICATIONS

Baxes, Digital Image Processing, 1994, John Wiley & Sons, Inc., , pp. 86-91.*

* cited by examiner

*Primary Examiner*—Matthew C. Bella
*Assistant Examiner*—Randolph Chu
(74) *Attorney, Agent, or Firm*—Fitzpatrick, Cella, Harper & Scinto

(57) ABSTRACT

This invention provides an image processing apparatus which can effectively remove conspicuous noise contained in image data, while suppressing deterioration of image information. Image data containing noise is input from an input terminal (100). Based on the output condition upon outputting image data after noise is removed, a parameter determination module (103) determines predetermined parameters used in a noise removal process. An example of the output condition is information associated with a resolution upon outputting image data. An individual noise removal module (104) removes noise contained in the image data using the parameters, and image data after the noise has been removed is output from an output terminal (105).

6 Claims, 20 Drawing Sheets

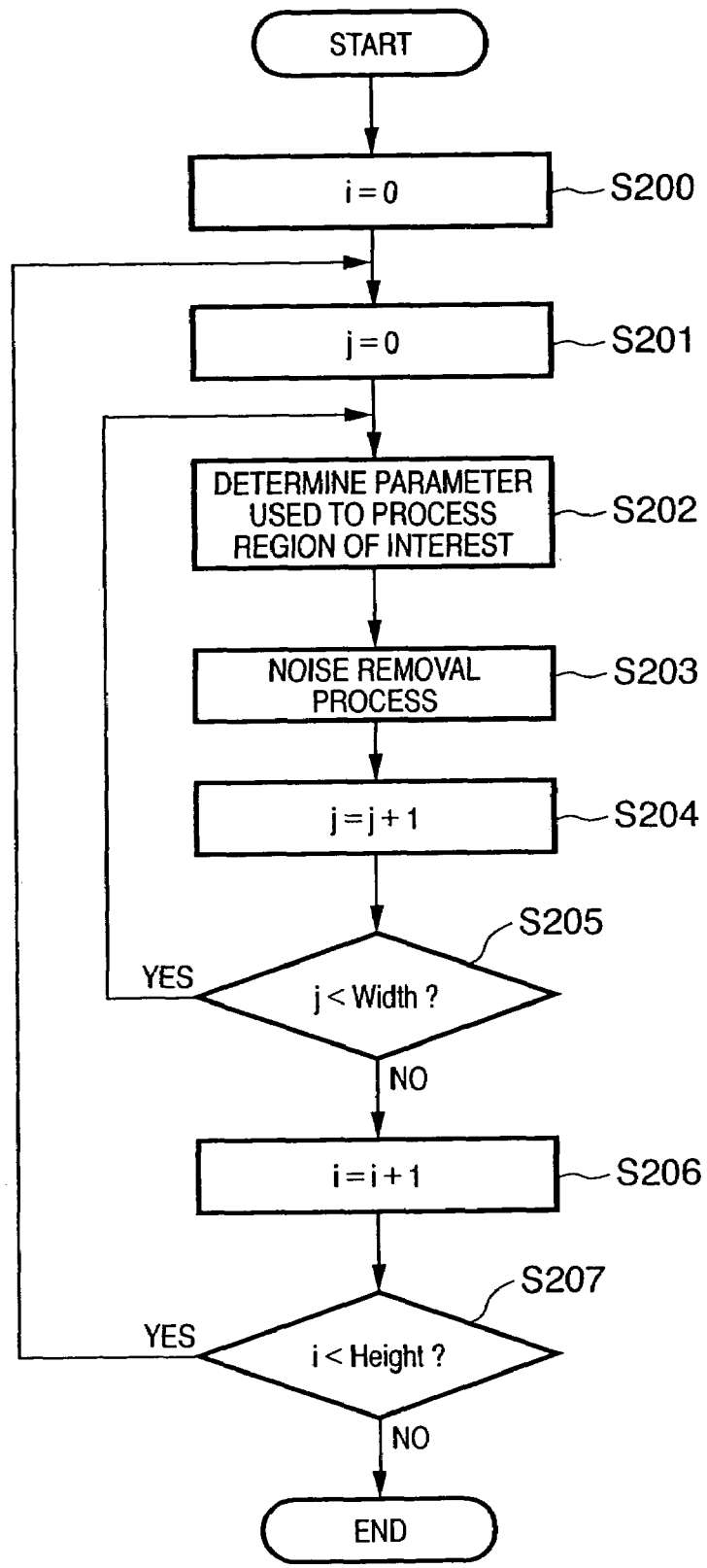

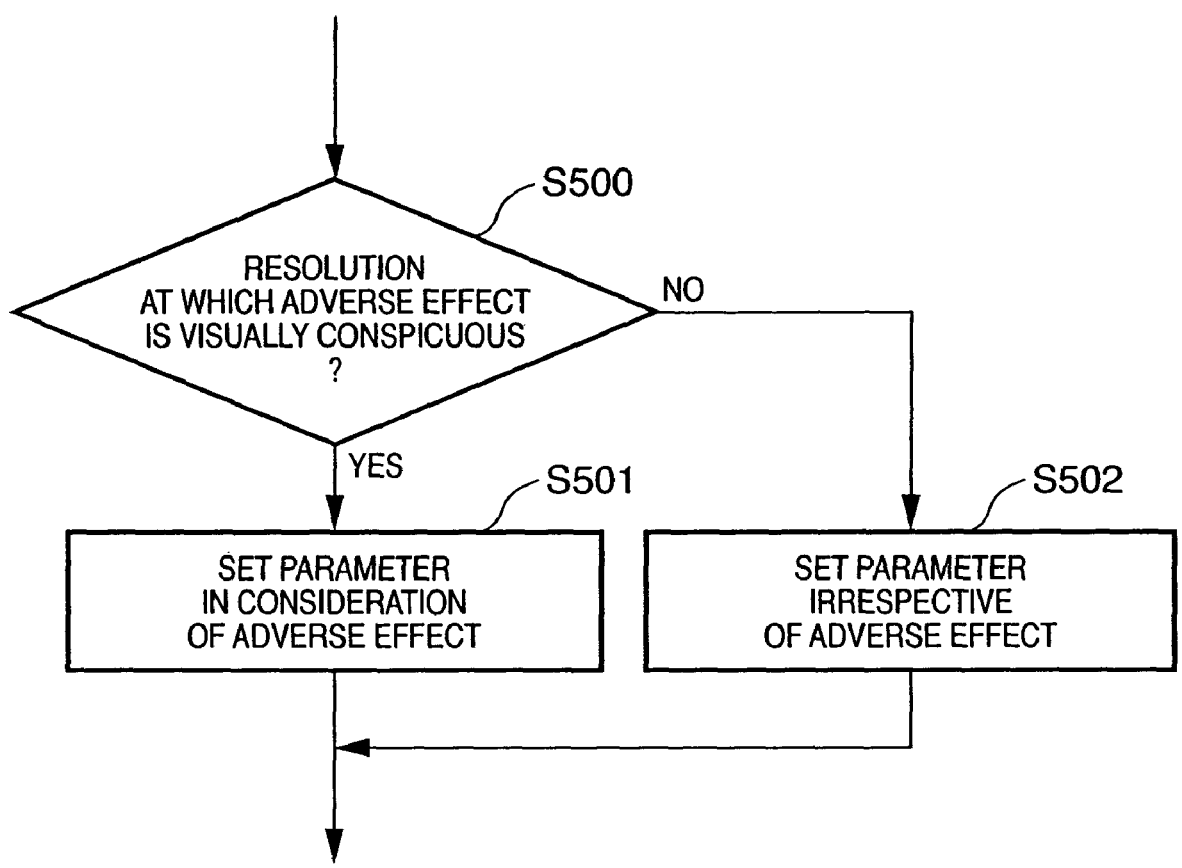

701 700

703 702

703 702

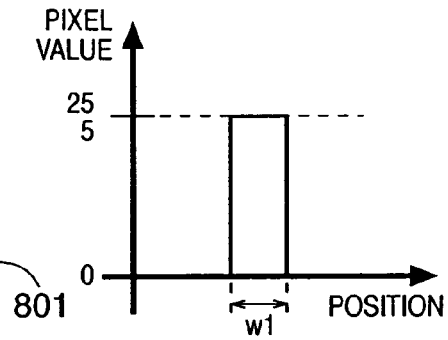
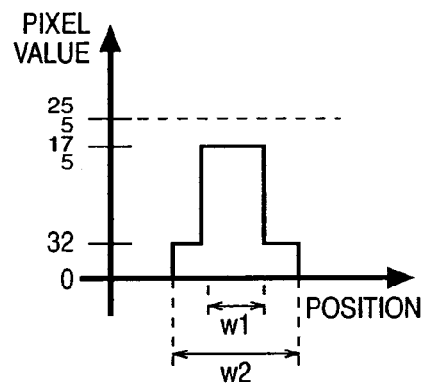
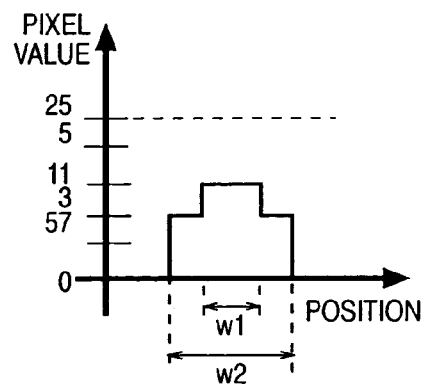

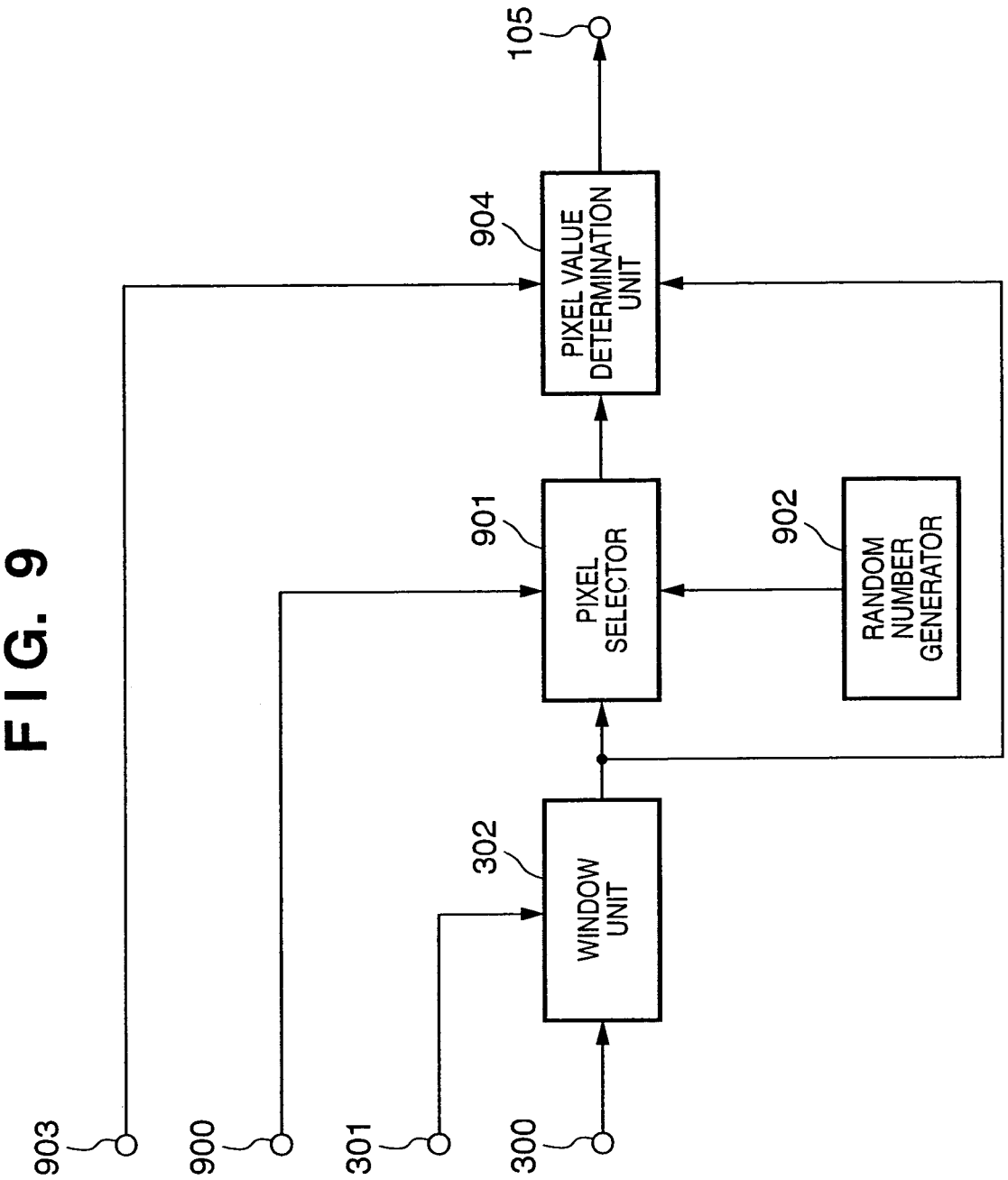

1100  1101

1100  1101

1201  1200

1201  1200

FIG. 13A
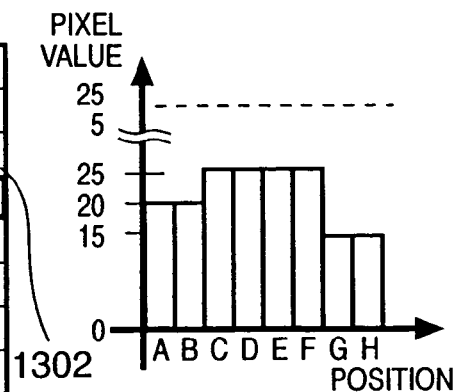
FIG. 13B
FIG. 13C
|Porg−Psell|≦Th1
(Th1=8)
FIG. 13D
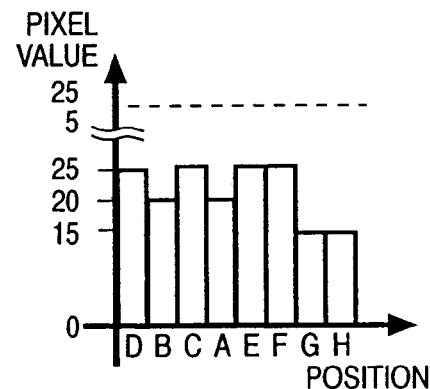
FIG. 13E
FIG. 13F
|Porg−Psell|≦Th2
(Th2=12)
FIG. 13G
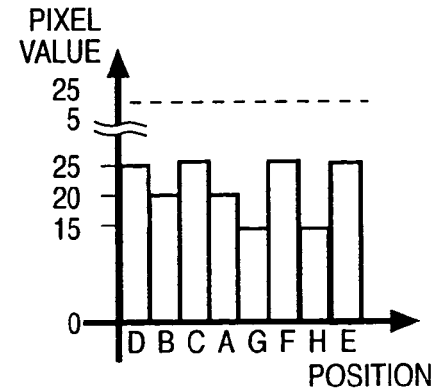
FIG. 13H

FIG. 17A

| 144 | 20 | 23 | 20 | 20 | 20 | 22 | 20 |
|---|---|---|---|---|---|---|---|
| 20 | 20 | 137 | 22 | 23 | 20 | 20 | 169 |
| 23 | 21 | 30 | 26 | 30 | 180 | 21 | 20 |
| 20 | 23 | 32 | 130 | 27 | 28 | 175 | 21 |
| 157 | 23 | 29 | 27 | 30 | 29 | 20 | 20 |
| 20 | 20 | 28 | 210 | 31 | 28 | 21 | 190 |
| 21 | 211 | 26 | 29 | 30 | 28 | 165 | 24 |
| 22 | 21 | 21 | 20 | 183 | 20 | 23 | 23 |

| 144 | 20 | 23 | 20 | 20 | 20 | 22 | 20 |
|---|---|---|---|---|---|---|---|
| 20 | 20 | 137 | 22 | 23 | 20 | 20 | 169 |
| 23 | 21 | 30 | 26 | 23 | 180 | 21 | 20 |
| 20 | 32 | 23 | 130 | 27 | 28 | 175 | 21 |
| 157 | 23 | 29 | 27 | 20 | 29 | 30 | 20 |
| 20 | 20 | 28 | 210 | 31 | 28 | 21 | 190 |
| 21 | 211 | 26 | 21 | 30 | 23 | 165 | 24 |
| 22 | 21 | 29 | 20 | 183 | 20 | 28 | 23 |

FIG. 17C

| 20 | 20 | 23 | 20 | 20 | 20 | 22 | 20 |
|---|---|---|---|---|---|---|---|
| 20 | 20 | 22 | 22 | 23 | 20 | 20 | 21 |
| 23 | 21 | 30 | 26 | 30 | 27 | 21 | 20 |
| 20 | 23 | 32 | 30 | 27 | 28 | 21 | 21 |
| 20 | 23 | 29 | 27 | 30 | 29 | 20 | 20 |
| 20 | 20 | 28 | 29 | 31 | 28 | 21 | 24 |
| 21 | 21 | 26 | 29 | 30 | 28 | 26 | 24 |
| 22 | 21 | 21 | 20 | 28 | 20 | 23 | 23 |

| 20 | 20 | 26 | 20 | 20 | 20 | 22 | 20 |
|---|---|---|---|---|---|---|---|
| 30 | 20 | 22 | 22 | 30 | 20 | 20 | 21 |
| 23 | 21 | 20 | 23 | 23 | 27 | 21 | 28 |
| 20 | 32 | 23 | 30 | 27 | 20 | 21 | 21 |
| 27 | 23 | 29 | 20 | 20 | 29 | 30 | 20 |
| 20 | 29 | 28 | 20 | 31 | 24 | 21 | 28 |
| 21 | 21 | 22 | 21 | 30 | 23 | 26 | 24 |
| 26 | 21 | 29 | 20 | 28 | 20 | 23 | 28 |

FIG. 19A

| 20 | 20 | 23 | 20 | 20 | 20 | 22 | 20 |
|----|----|----|----|----|----|----|----|
| 20 | 20 | 22 | 22 | 23 | 20 | 20 | 31 |
| 23 | 21 | 30 | 26 | 30 | 27 | 21 | 20 |
| 20 | 23 | 32 | 30 | 27 | 28 | 21 | 21 |
| 20 | 23 | 29 | 27 | 30 | 29 | 20 | 20 |
| 20 | 20 | 28 | 29 | 31 | 28 | 21 | 24 |
| 21 | 21 | 26 | 29 | 30 | 28 | 26 | 24 |
| 22 | 21 | 21 | 20 | 28 | 20 | 23 | 26 |

| 20 | 20 | 26 | 20 | 20 | 20 | 22 | 20 |
|----|----|----|----|----|----|----|----|
| 30 | 20 | 22 | 22 | 30 | 20 | 20 | 21 |
| 23 | 21 | 20 | 23 | 23 | 27 | 21 | 28 |
| 20 | 32 | 23 | 30 | 27 | 20 | 21 | 21 |
| 27 | 23 | 29 | 20 | 20 | 29 | 30 | 20 |
| 20 | 29 | 28 | 20 | 31 | 24 | 21 | 28 |
| 21 | 21 | 22 | 21 | 30 | 23 | 26 | 24 |
| 26 | 21 | 29 | 20 | 28 | 20 | 26 | 28 |

| 22 | 23 | 22 | 23 | 21 | 21 | 20 | 21 |
|----|----|----|----|----|----|----|----|
| 23 | 22 | 21 | 23 | 23 | 22 | 22 | 22 |
| 24 | 23 | 24 | 24 | 25 | 23 | 22 | 22 |
| 24 | 24 | 24 | 24 | 24 | 24 | 24 | 23 |
| 24 | 26 | 26 | 25 | 24 | 25 | 24 | 23 |
| 23 | 24 | 24 | 24 | 24 | 26 | 25 | 24 |
| 23 | 24 | 23 | 25 | 24 | 25 | 24 | 28 |
| 23 | 24 | 23 | 25 | 23 | 25 | 24 | 25 |

IMAGE PROCESSING APPARATUS AND CONTROL METHOD THEREOF

FIELD OF THE INVENTION

The present invention relates to an image processing apparatus, which can visually remove noise components from image data on which noise components that are not contained in the original signal components are superposed, and a control method thereof.

BACKGROUND OF THE INVENTION

Conventionally, a technique for removing noise components from a digital image on which noise components that are not contained in the original signal components are superposed has been studied. The characteristics of noise to be removed are diverse depending on their generation factors, and noise removal methods suited to those characteristics have been proposed.

For example, when an image input device such as a digital camera, image scanner, or the like is assumed, noise components are roughly categorized into noise which depends on the input device characteristics of a solid-state image sensing element or the like and input conditions such as an image sensing mode, scene, or the like, and has already been superposed on a photoelectrically converted analog original signal, and noise which is superposed via various digital signal processes after the analog signal is converted into a digital signal via an A/D converter.

As an example of the former (noise superposed on an analog signal), impulse noise that generates an isolated value to have no correlation with surrounding image signal values, noise resulting from the dark current of the solid-state image sensing element, and the like are known. As an example of the latter (noise superposed during a digital signal process), noise components are amplified simultaneously with signal components when a specific density, color, and the like are emphasized in various correction processes such as gamma correction, gain correction for improving the sensitivity, and the like, thus increasing the noise level.

As an example of deterioration of an image due to noise superposed in a digital signal process, since an encoding process using a JPEG algorithm extracts a plurality of blocks from two-dimensional (2D) image information, and executes orthogonal transformation and quantization for respective blocks, a decoded image suffers block distortion that generates steps at the boundaries of blocks.

In addition to various kinds of noise mentioned above, a factor that especially impairs the image quality is noise (to be referred to as "low-frequency noise" hereinafter) which is generated in a low-frequency range and is conspicuously observed in an image sensed by a digital camera or the like. This low-frequency noise often results from the sensitivity of a CCD or CMOS sensor as a solid-state image sensing element. In an image sensing scene such as a dark scene with a low signal level, a shadowy scene, or the like, low-frequency noise is often emphasized due to gain correction that raises signal components irrespective of poor S/N ratio.

Furthermore, the element sensitivity of the solid-state image sensing element depends on its chip area. Hence, in a digital camera which has a large number of pixels within a small area, the amount of light per unit pixel consequently decreases, and the sensitivity lowers, thus producing low-frequency noise. For example, low-frequency noise is often visually recognized as pseudo mottled texture across several to ten-odd pixels on a portion such as a sheet of blue sky or the like which scarcely has any change in density (to be referred to as a "flat portion" hereinafter). Some digital cameras often produce false colors.

As a conventionally proposed noise removal method, a method using a median filter (to be abbreviated as "MF" hereinafter) and a method using a low-pass filter (to be abbreviated as "LPF" hereinafter) that passes only a low-frequency range have prevailed.

The noise removal method using an MF removes impulse noise by extracting a pixel value which assumes a median from those of a pixel of interest and its surrounding pixels, and replacing the pixel value of interest by the extracted value. The noise removal method using an LPF is effective for impulse noise, block distortion mentioned above, and the like, and removes noise by calculating the weighted mean using a pixel value of interest and its surrounding pixel values, and replacing the pixel value of interest by the calculated weighted mean.

On the other hand, as a method effective for low-frequency noise, a method of replacing a pixel value of interest by a pixel value which is probabilistically selected from those around the pixel of interest (to be referred to as a "noise distribution method" hereinafter) has been proposed.

A conventional process for removing noise superposed on image information is done while balancing the effects of the aforementioned noise removal process and the adverse effects produced by these processes, i.e., within a range in which sufficient effects are recognized and the degree of adverse effects is allowed.

When digital image information is to be displayed on a display, its resolution can be changed to various values at the time of display using application software or the like. Also, digital image information can be printed using a printer in an enlarged or reduced scale.

However, whether or not the adverse effects due to removal of noise superposed on image information are visually recognized largely depends on the resolution of image information. For example, as a feature of the adverse effect of an LPF, an image blurs. As one factor for determining the degree of production of such image blur, a window size is known. However, when the window size is fixed, the window size is uniquely determined with respect to the number of pixels, but the size upon referring to pixels in practice is determined by the number of pixels and resolution. For this reason, a blur as an adverse effect of an LPF is visually recognized depending on the resolution of image information.

SUMMARY OF THE INVENTION

The present invention has been proposed to solve the conventional problems, and has as its object to provide an image processing apparatus, which can effectively remove conspicuous noise contained in image data while suppressing deterioration of image information, and a control method thereof.

In order to achieve the above object, an image processing apparatus according to the present invention is characterized by comprising image input means for inputting image data that contains noise, output condition input means for inputting an output condition upon outputting the image data, noise removal means for removing the noise contained in the image data using a predetermined parameter, parameter determination means for determining the parameter on the basis of the output condition, and output means for outputting image data after the noise has been removed.

The image processing apparatus according to the present invention is characterized in that the noise removal means sets a predetermined window region for the image data containing the noise, and removes the noise by referring to the window region, and the parameter determination means determines a parameter used to designate a size of the window region.

The image processing apparatus according to the present invention is characterized in that the noise removal means removes the noise by making a product sum calculation of pixels within the window region using a low-pass filter.

The image processing apparatus according to the present invention is characterized in that the parameter determination means determines weighting coefficients for pixels used in the product sum calculation.

The image processing apparatus according to the present invention is characterized in that the noise removal means removes the noise using a median filter.

The image processing apparatus according to the present invention is characterized in that the noise removal means comprises selection means for probabilistically selecting an arbitrary pixel in the window region, pixel value determination means for determining a new pixel value on the basis of a pixel value of the selected pixel, and a pixel value of a pixel of interest, and substitution means for substituting the pixel value of the pixel of interest by the new pixel value.

The image processing apparatus according to the present invention is characterized in that the parameter determination means determines a selection rule of pixels in the selection means.

The image processing apparatus according to the present invention is characterized in that the parameter determination means determines a determination rule in the pixel value determination means.

Also, an image processing apparatus according to the present invention is characterized by comprising image input means for inputting image data that contains noise which consists of first noise and second noise, output condition input means for inputting an output condition upon outputting the image data, first noise removal means for removing the first noise contained in the image data using a predetermined first parameter, second noise removal means for removing the second noise contained in the image data using a predetermined second parameter, parameter determination means for determining the first and second parameters, and output means for outputting image data after the noise has been removed.

The image processing apparatus according to the present invention is characterized in that the second noise disturbs a first noise removal process of the first noise removal means, and a second noise removal process of the second noise removal means is executed prior to the first noise removal process of the first noise removal means.

Furthermore, an image processing apparatus according to the present invention is characterized by comprising image input means for inputting image data that contains noise, output condition input means for inputting an output condition upon outputting the image data, first noise removal means for removing the first noise contained in the image data using a predetermined first parameter, third noise removal means for removing new noise produced by the noise removal process of the first noise removal process using a predetermined third parameter, parameter determination means for determining the first and third parameters, and output means for outputting image data after the noise and the new noise have been removed by the first and third noise removal means.

The image processing apparatus according to the present invention is characterized in that the noise removal process of the first noise removal means is executed prior to a new noise removal process of the third noise removal means.

Moreover, an image processing apparatus according to the present invention is characterized by comprising image input means for inputting image data that contains noise which consists of first noise and second noise, output condition input means for inputting an output condition upon outputting the image data, first noise removal means for removing the first noise contained in the image data using a predetermined first parameter, second noise removal means for removing the second noise, which is contained in the image data and disturbs a first noise removal process of the first noise removal means, using a predetermined second parameter, third noise removal means for removing new noise produced by the noise removal process of the first noise removal process using a predetermined third parameter, parameter determination means for determining the first, second, and third parameters, and output means for outputting image data after the noise and new noise have been removed.

The image processing apparatus according to the present invention is characterized in that the output condition is information associated with a resolution upon outputting the image data.

The image processing apparatus according to the present invention is characterized in that the output condition is information associated with an enlargement ratio upon outputting the image data.

The image processing apparatus according to the present invention is characterized in that the output condition is information associated with the number of pixels upon outputting the image data.

The image processing apparatus according to the present invention is characterized in that removal of the noise is visual reduction of the noise contained in the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flow chart for explaining an outline of the operation sequence of the image processing apparatus according to the present invention;

FIG. 5 is a flow chart showing the detailed operation sequence upon determining parameters in a parameter determination module 103;

FIGS. 8A to 8H are views showing the relationship between weights used upon calculating the weighted mean in the LPF process, and the processing results;

FIG. 9 is a block diagram showing the detailed arrangement of the individual noise removal module 104 for executing a noise removal process that exploits the noise distribution method;

FIGS. 13A to 13H are views showing the relationship between the threshold values used in the noise distribution process, and the processing results;

FIGS. 17A to 17D are schematic views for explaining the effects of noise removal according to the fourth embodiment;

FIGS. 19A to 19C are views for explaining the effects of a noise removal process according to the fifth embodiment.

DETAILED DESCRIPTION OF THE PREFERRED EMBODIMENTS

Preferred embodiments of the present invention will now be described in detail in accordance with the accompanying drawings.

First Embodiment

Figure 1A:
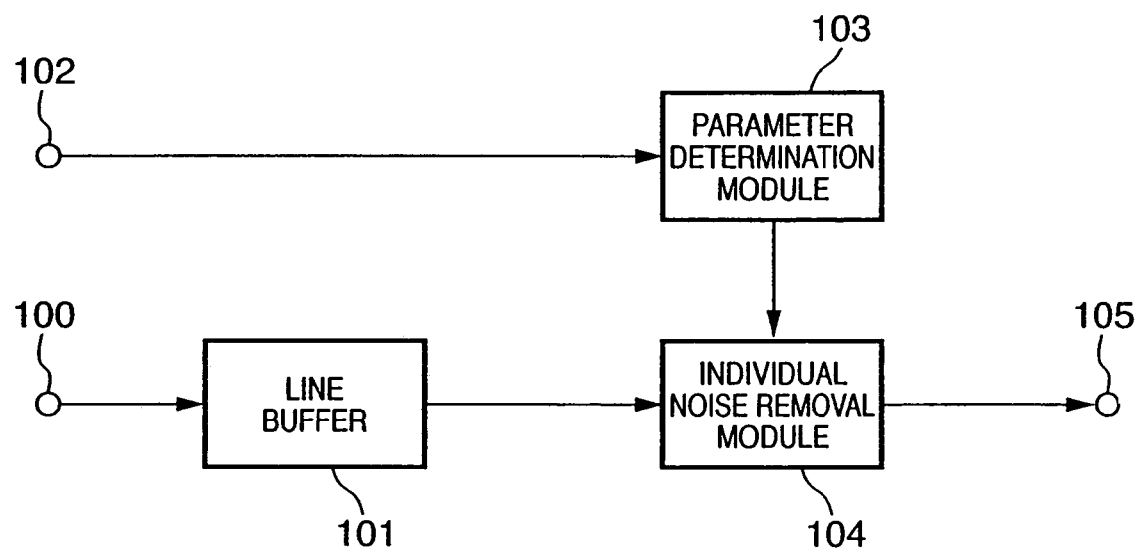
FIG. 1A is a block diagram showing the arrangement of principal part of an image processing apparatus which executes a noise removal process according to the first embodiment of the present invention.

FIG. 1A is a block diagram showing the arrangement of principal part of an image processing apparatus that executes a noise removal process according to an embodiment of the present invention. Referring to FIG. 1A, reference numeral 100 denotes an input terminal of color image information; and 102, an input terminal of resolution information used upon outputting image information by an image display unit, print unit, or the like (not shown). The input terminal 100 is connected to a line buffer 101, which stores and holds input image information for respective lines. The input terminal 102 is connected to a parameter determination module 103, which determines parameters used in an individual noise removal module 104 (to be described later) on the basis of the input resolution information.

The line buffer 101 and parameter determination module 103 are connected to the individual noise removal module 104. The individual noise removal module 104 executes noise removal processes based on an MF, LPF, noise distribution method, and the like. The individual noise removal module 104 is also connected to an output terminal 105, from which image information that has undergone the noise removal processes is output.

Figure 1B:
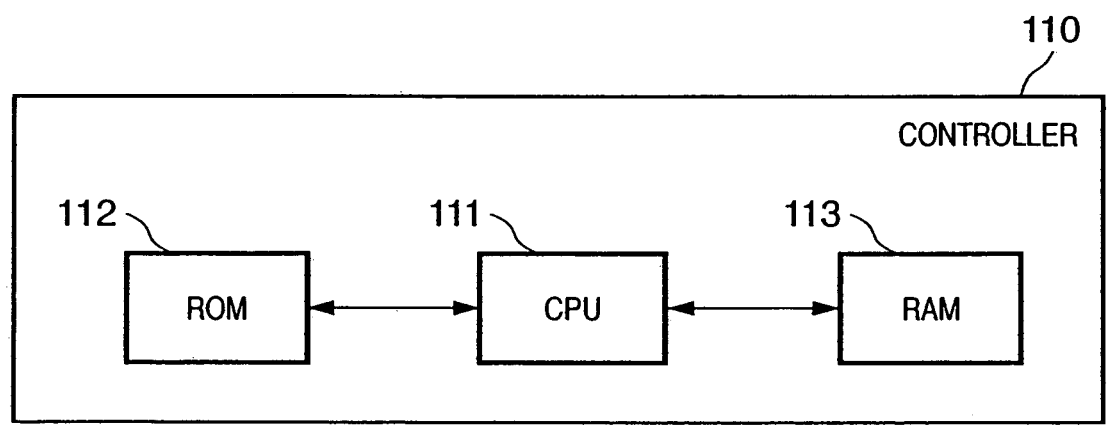
FIG. 1B is a block diagram showing a hardware arrangement required to implement the image processing apparatus, the principal part of which is shown in FIG. 1A, as a noise removal apparatus.

FIG. 1B is a block diagram showing a hardware arrangement required to implement the image processing apparatus, the principal part of which is shown in FIG. 1A, as a noise removal apparatus. Referring to FIG. 1B, reference numeral 110 denotes a controller which comprises a CPU 111, ROM 112, RAM 113, and the like. In the controller 110, the CPU 111 makes control to implement the operations and processes of the aforementioned building components in accordance with a control program held by the ROM 112. Note that the RAM 113 is used as a work area of the CPU 111.

FIG. 2 is a flow chart for explaining an outline of the operation sequence of the image processing apparatus according to the present invention. Assume that input image information has a size of the number of horizontal pixels=Width×the number of vertical pixels=Height. Parameters are initialized. More specifically, variable i indicating a vertical processing address is reset to zero (step S200). Likewise, variable j indicating a horizontal processing address is reset to zero (step S201).

The parameter determination module 103 determines parameters (to be described later) used upon executing a noise removal process of pixels within a window on the basis of resolution information input from the input terminal 102 (step S202). The individual noise removal module 104 visually reduces noise superposed on image information by noise removal processes based on an MF, LPF, noise distribution method, and the like (to be described later) (step S203). Note that the noise removal processes are done based on the parameters determined in step S202.

The horizontal address is counted up for one pixel (step S204). Then, a series of processes are repeated while scanning the pixel of interest one by one until the horizontal pixel position reaches the (Width)-th pixel (step S205). Likewise, the vertical address is counted up for one pixel (step S206). Then, a series of processes are repeated while scanning the pixel of interest one by one until the vertical pixel position reaches the (Height)-th pixel (step S207).

That is, in the image processing apparatus according to the present invention, image data containing noise is input from the input terminal 100. Then, the parameter determination module 103 determines predetermined parameters used in the noise removal process on the basis of an output condition upon outputting image data after noise is removed. The individual noise removal module 104 removes noise contained in image data using the determined parameters, and image data after noise is removed is output from the output terminal 105.

Figure 3:
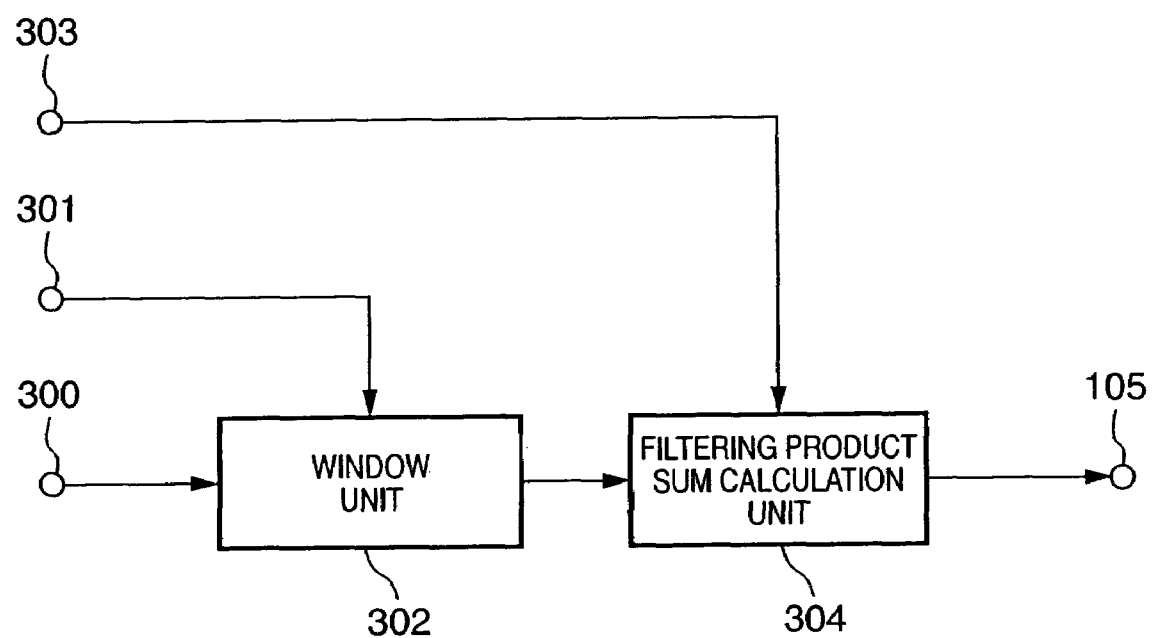
FIG. 3 is a block diagram showing the detailed arrangement of an individual noise removal module 104 for executing a noise removal process using an LPF.

The detailed arrangement of the individual noise removal module 104 shown in FIGS. 1A and 1B will be described below. FIG. 3 is a block diagram showing the detailed arrangement of the individual noise removal module 104 that executes a noise removal process using an LPF. Referring to FIG. 3, reference numeral 300 denotes an input terminal, which receives image information stored in the line buffer 101. Reference numeral 301 denotes an input terminal of parameters which are determined by the parameter determination module 103 and are used in a window unit 302 (to be described below). The input terminals 300 and 301 are connected to the window unit 302. The window unit 302 can form a 2D reference pixel window having a pixel of interest as the center by receiving image information from the line buffer 101 for several lines.

On the other hand, reference numeral 303 denotes an input terminal of parameters which are determined by the parameter determination module 103 and are used in a filtering product sum calculation unit 304 (to be described below). The window unit 302 and input terminal 303 are connected to the filtering product sum calculation unit 304. The filtering product sum calculation unit 304 calculates a weighted mean using pixels which form the window, and the parameters input via the input terminal 303, and replaces the pixel value of interest by the calculated weighted mean.

Figure 4:
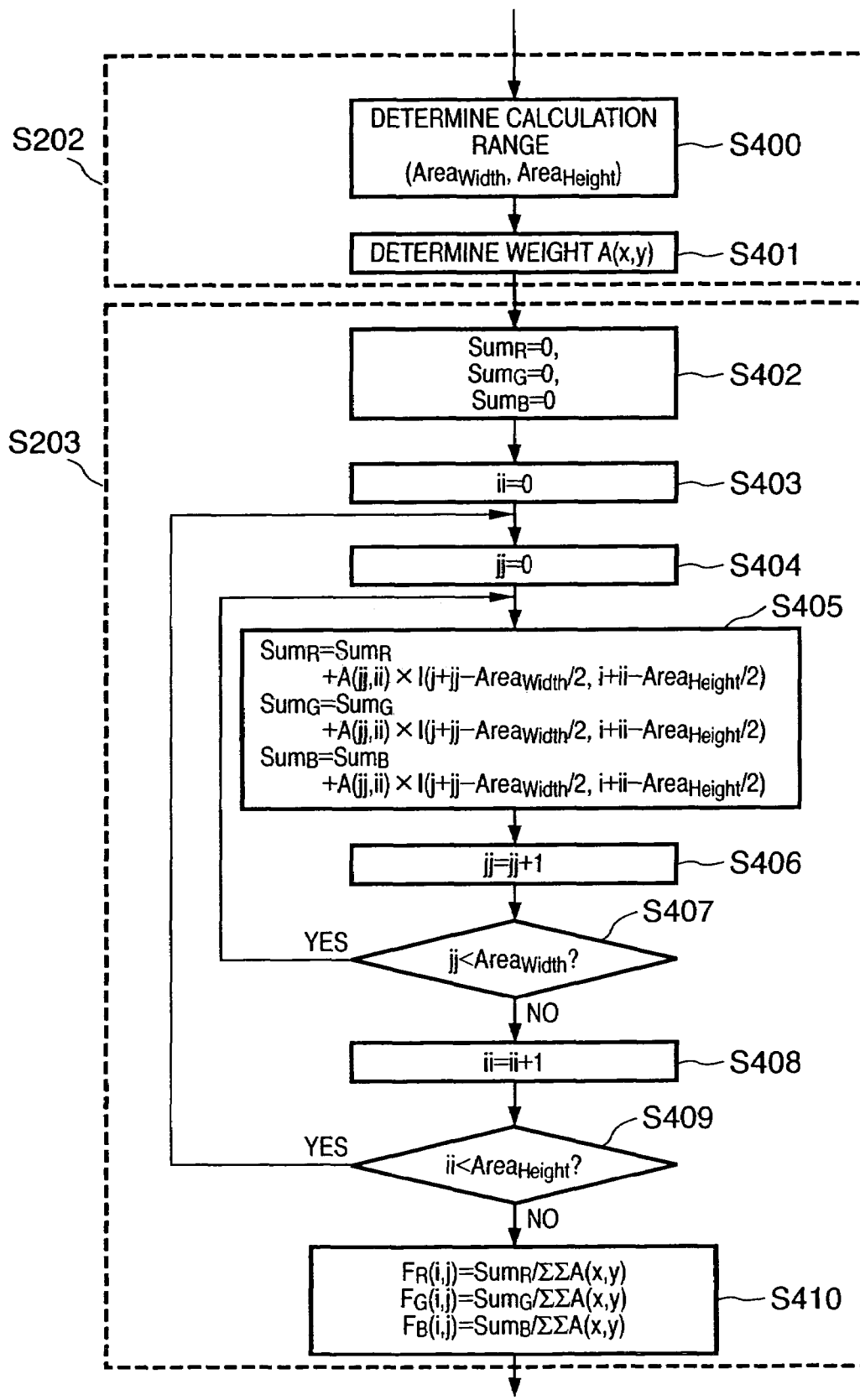
FIG. 4 is a flow chart for explaining the operation sequence of the individual noise removal module 104 with the arrangement shown in FIG. 3.

FIG. 4 is a flow chart for explaining the operation sequence of the individual noise removal module 104 with the arrangement shown in FIG. 3. In the flow chart of FIG. 4, ranges bounded by the broken lines respectively indicate the parameter determination process (step S202) used to process a region of interest, and the noise removal process (step S203) in the flow chart shown in FIG. 2, and steps before and after these steps in the flow chart of FIG. 2 are not shown.

The parameter determination module 103 determines a calculation range ($Area_{Width}$, $Area_{Height}$) on the basis of resolution information input via the input terminal 102 (step S400). Then, the parameter determination module 103 determines weights A(x, y) used upon calculating the weighted mean using pixel values within the calculation range on the basis of the resolution information input via the input terminal 102 (step S401).

The individual noise removal module 104 makes initialization to reset, variables $Sum_R$, $Sum_G$, and $Sum_B$ used to hold the cumulative sum values of product sum values of respective pixel values I(j+jj−$Area_{Width}$/2, i+ii−$Area_{Height}$/2) and weights A(jj, ii) to zero (step S402). If $Area_{Width}$/2 or $Area_{Height}$/2 is indivisible, a value obtained by cutting down the quotient to a maximum integer value within a range that does not exceed the quotient is adopted.

Then, parameters are initialized. That is, variable ii indicating a vertical processing address within the calculation range is reset to zero (step S403). Likewise, variable jj indicating a horizontal processing address within the calculation range is reset to zero (step S404).

Then, the cumulative sum values of product sum values of respective pixel values I(j+jj−$Area_{Width}$/2, i+ii−$Area_{Height}$/2) within the calculation range and weight A(ii, jj) are calculated for respective colors (step S405). The horizontal address within the calculation range is counted up for one pixel (step S406). A series of processes are repeated while scanning the pixels within the calculation range one by one until the horizontal count value reaches $Area_{Width}$ (step S407). Likewise, the vertical address within the calculation range is counted up for one pixel (step S408), and a series of processes are repeated until the vertical count value reaches $Area_{Height}$ (step S409).

After the above processes, the product sum calculation results $Sum_R$, $Sum_G$, and $Sum_B$ using the pixel values within the calculation range are divided by the sum total $\Sigma y \Sigma x A(x, y)$ of the weights to calculate weighted means within the calculation range. The weighted means are substituted as new pixel values Fr(j, i), Fg(j, i), and Fb(j, i) (step S410). Note that $\Sigma a f(a)$ indicates the sum total of f(a) for all "a"s.

The parameters determined in steps S400 and S401 may assume different values for R, G, and B in an RGB color image. In such case, the weighted mean calculation process in steps S402 to S410 is executed for an individual calculation range for each color using individual weights.

More specifically, in the image processing apparatus according to the present invention, the individual noise removal module 104 sets a predetermined window region for image data containing noise, removes noise by referring to that window region, and the parameter determination module 103 determines parameters used to designate the size of the window region.

In this embodiment, R, G, and B components have been exemplified as image information to be used. Alternatively, this embodiment may be applied to luminance and color difference components used in JPEG or the like, or complementary color components such as C, M, Y, and K components or the like used as ink colors in a printer or the like.

That is, the image processing apparatus according to the present invention is characterized in that the parameter determination module 103 determines weighting coefficients for respective pixels used in the product sum calculations.

FIG. 5 is a flow chart showing the detailed operation sequence upon determining respective parameters in the parameter determination module 103. In the flow chart of FIG. 5, processes are selectively executed in accordance with resolution information input via the input terminal 102.

More specifically, it is checked if the adverse effect of the noise removal process to be executed in step S203 shown in FIG. 2 is visually conspicuous at the resolution input via the input terminal 102 (step S500). As a result, if the adverse effect of the noise removal process is visually conspicuous at that resolution (Yes in step S500), parameters that suppress the adverse effect are set, and the processing flow shown in FIG. 5 ends (step S501). On the other hand, if it is determined that the adverse effect of the noise removal process is not visually conspicuous at that resolution (No in step S500), parameters that can assure a high noise removal effect are set, and the processing flow shown in FIG. 5 ends (step S502). Note that FIG. 5 has exemplified a case wherein parameters are switched in association with only one predetermined resolution. Also, parameters can be switched in phases in correspondence with resolutions.

The resolution and the effect and adverse effect of the noise removal process will be explained below.

Figure 6A:
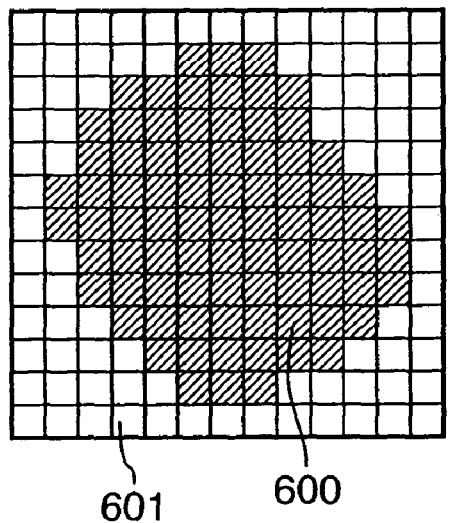
FIGS. 6A to 6D are views showing the relationship between noise produced in an image sensed by a digital camera and the LPF processing results.

FIGS. 6A to 6D show the relationship between noise produced in an image sensed by a digital camera and the LPF processing results. FIG. 6A shows an example of noise superposed on image information. A hatched pixel region 600 includes pixels that contain noise components, and is present in an image as a cluster of several to ten-odd successive pixels. Reference numeral 601 denotes a white pixel region other than noise components.

Figure 6B:
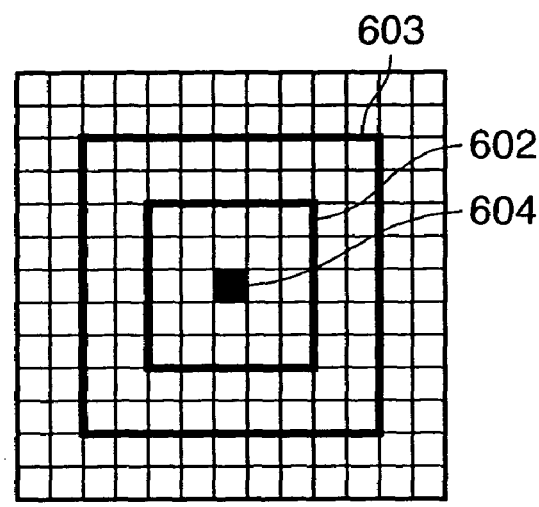

FIG. 6B shows the processing range of the LPF process. Regions 602 and 603 within two bold frames indicate LPF processing ranges which have a pixel 604 as a pixel of interest. Note that the region 602 indicates a 5×5 pixel window, and the region 603 indicates a 9×9 pixel window.

Figure 6C:
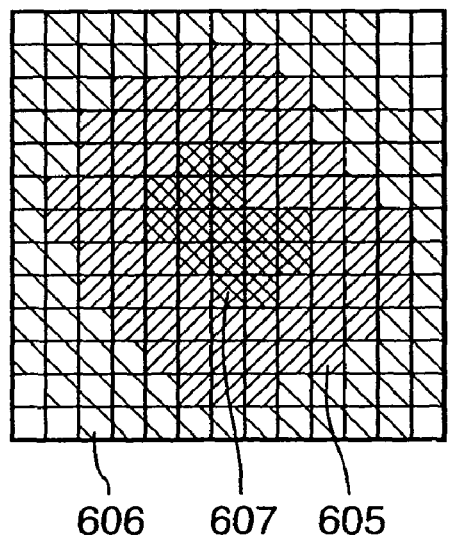

FIG. 6C shows the state of an image as the processing result obtained when the LPF process that uses the 5×5 pixel window 602 as the processing range is executed for the image containing noise shown in FIG. 6A. In FIG. 6C, reference numeral 605 denotes a hatched region where noise components are attenuated. Also, reference numeral 606 denotes a region where noise components are diffused by the LPF process although it is originally free from any noise components.

Also, reference numeral 607 denotes a region where the effect of the processing is small due to an insufficient window size compared to the noise range. In the region 607, since the LPF process is done within the noise range, the weighted mean of noise components is calculated, and the effect of attenuating noise components is small. On the other hand, in the region 605, since the weighted mean is calculated using the pixel values of the region 601 which is originally free from any noise component, noise components are attenuated.

Figure 6D:
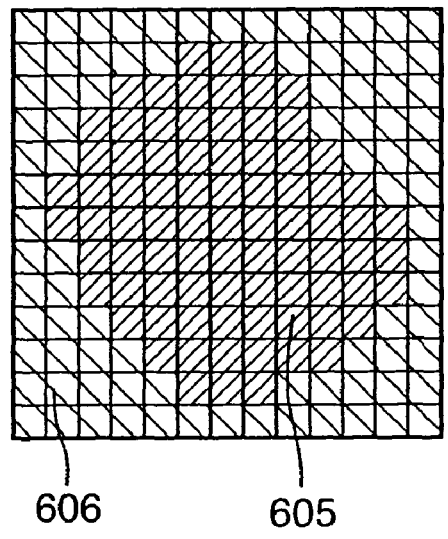

FIG. 6D shows the state of an image as the processing result obtained when the LPF process that uses the 9×9 pixel window 603 as the processing range is executed for the image containing noise shown in FIG. 6A. In FIG. 6D, since the LPF processing range is sufficiently broader than the noise range, no region where the effect of the process is small is present unlike in FIG. 6C. As shown in FIGS. 6A to 6D, the noise removal effect can be improved by assuring a larger processing range.

That is, the image processing apparatus according to the present invention is characterized in that the individual noise removal module 104 removes noise by making product sum calculations for respective pixels within a window region using a low-pass filter.

Figure 7A:
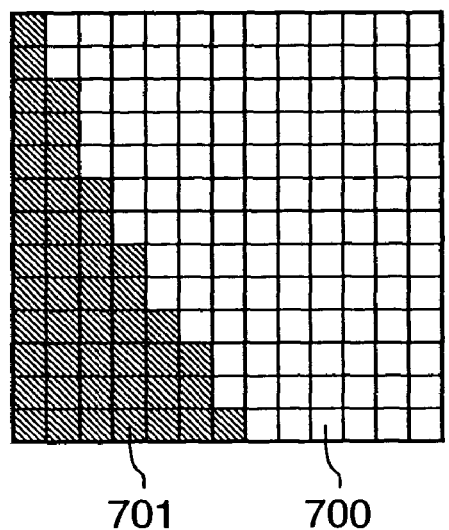
FIGS. 7A to 7C are views showing the relationship between an edge portion present in image information and the LPF processing results.
Figure 7B:
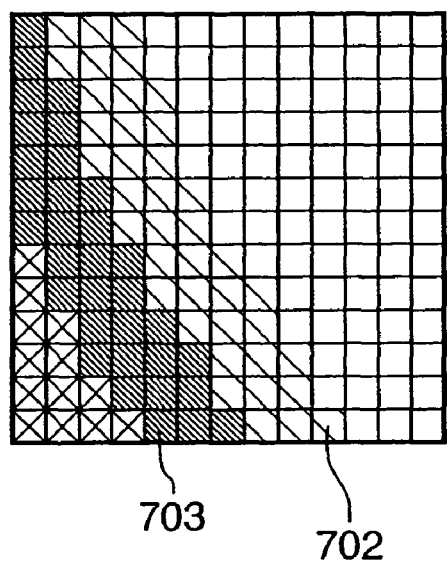
Figure 7C:
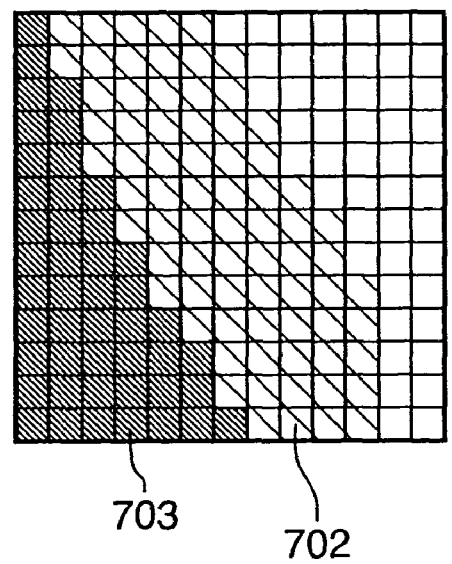

FIGS. 7A to 7C show the relationship between an edge portion present in image information and the LPF processing results. FIG. 7A shows an example of an edge portion present in image information. Reference numeral 700 denotes a low-density region; and 701, a high-density region. In the following description, the processing windows 602 and 603 of two sizes shown in FIG. 6B are used.

FIG. 7B shows the state of an image as the processing result obtained when the LPF process that uses the 5×5 pixel window 602 as the processing range is executed for the image shown in FIG. 7A. Note that reference numeral 702 denotes a region, the density values of which belonged to the low-density region 700 before the process, but which increase due to diffusion of pixel values of the high-density region as a result of the LPF process. Reference numeral 703 denotes a region, the density values of which belong to the high-density region 701 before process but decrease due to diffusion of pixel values as a result of the LPF process.

FIG. 7C shows the state of an image as the processing result obtained when the LPF process that uses the 9×9 pixel window 603 as the processing range is executed for the image shown in FIG. 7A. In FIG. 7C, the ranges of the regions 702 and 703 where the pixel values are diffused are broadened compared to FIG. 7B. The region 702 or 703 is visually recognized as a blur. For this reason, the region 702 or 703 is preferably narrower since it becomes harder to visually recognize, thus reducing the adverse effect.

FIGS. 8A to 8H show the relationship between the weights used upon calculating the weighted mean in the LPF process, and the processing results. FIG. 8A shows an image state of an original image. In FIG. 8A, reference numeral 800 denotes a pixel region with a pixel value=255, i.e., an isolated region in an image; and 801, a region with a pixel value=0, i.e., a non-isolated region. FIG. 8B is a graph showing a change in pixel value. In FIG. 8B, the abscissa plots one line bounded by the bold frame in FIG. 8A, and the ordinate plots pixel values of pixels.

FIG. 8C shows the first example of weights used upon calculating the weighted mean in the LPF process, i.e., an example in which the pixel of interest has a large weight. FIG. 8D shows an image state as a result of the LPF process which is executed using the weights shown in FIG. 8C for the image information shown in FIG. 8A. FIG. 8E is a graph showing a change in pixel value. In FIG. 8E, the abscissa plots one line bounded by the bold frame in FIG. 8D.

On the other hand, FIG. 8F shows the second example of weights used upon calculating the weighted mean in the LPF process, i.e., an example in which the pixel of interest has a small weight. FIG. 8G shows an image state as a result of the LPF process which is executed using the weights shown in FIG. 8F for the image information shown in FIG. 8A. FIG. 8H is a graph showing a change in pixel value. In FIG. 8H, the abscissa plots one line bounded by a bold frame in FIG. 8G.

Upon comparison between FIGS. 8E and 8H as the results of two different LPF processes, the pixel values of pixels which neighbor the isolated region slightly increase, and those of the isolated region decrease slightly in FIG. 8E. However, the width of the most isolated portion near the isolated region is w1 as in the original image, and the image signal suffers less deterioration. For this reason, if the isolated region shown in FIG. 8B is image information, the adverse effect is relatively small. On the other hand, in FIG. 8H, the pixel values of pixels which neighbor the isolated region increase largely, while those of the isolated region decrease largely. Also, the width of the most isolated portion near the isolated region is w2 unlike in the original image, and a large effect of the process appears.

The noise removal effects and adverse effects with respect to the processing ranges and weights in the LPF process have been explained using FIGS. 6A to 6D, FIGS. 7A to 7C, and FIGS. 8A to 8H. Note that visual conspicuity of the adverse effect after the process varies depending on the resolution upon displaying or printing an image.

The region 606 in FIGS. 6C and 6D, and region 702 or 703 in FIGS. 7B and 7C are more likely to be visually recognized as a blur when the output resolution is not so high. On the other hand, when the output resolution is sufficiently high, since these blur regions are harder to visually detect, the adverse effect is obscured. For this reason, at an output resolution at which the blur region 702 or 703 generated in FIG. 7C as an adverse effect of using parameters that assures a high noise reduction effect is hard to visually detect, parameters corresponding to the window 603 that can assure a high noise removal effect and execute a process over a broad range as shown in FIG. 6D are preferably set. On the other hand, in case of an output resolution at which the region 702 or 703 is visually detected as a blur, parameters corresponding to the window 602 which narrows down the processing range to suppress the adverse effect of noise removal are preferably set.

If the isolated region 800 shown in FIG. 8A is noise, and the output resolution is sufficiently high, even the noise region broadened to the range w2 is hard to visually detect. Hence, the result shown in FIG. 8H in which the attenuation amount of the maximum isolated pixel value becomes large is desirable rather than spread of the range in which the pixel values increase. For this reason, when the output resolution is high, parameters shown in the example of FIG. 8F, which increase the attenuation amount of an isolated portion, are preferably selected as weighting parameters. When the output resolution is low, if the range in which the pixel values increase largely is spread, as shown in FIG. 8H, the noise removal effect may visually stand out counter to its original purpose. In such case, parameters shown in the example of FIG. 8C that narrow down the increase range of pixel values are preferably selected.

In this embodiment, the processing ranges and weights have been exemplified as parameters to be changed. However, the present invention is not limited to such specific parameters. The determination rules of parameters with respect to the resolution are preferably determined in correspondence with the characteristics of image information output means.

As described above, according to the present invention, visual conspicuity of the adverse effect generated upon the noise removal process can be determined in correspondence with the output resolution. As a result, the noise removal process can be efficiently executed while suppressing the adverse effect of the noise removal process.

Second Embodiment

In the first embodiment of the present invention described above, since the processing parameters are changed in correspondence with the output resolution upon executing the noise removal process using the LPF process, the noise removal process is efficiently executed while suppressing the adverse effect of the noise removal process.

This embodiment will exemplify an effective noise removal process by changing processing parameters in correspondence with the output resolution upon using another noise removal method. Note that a description of the same items as those in the first embodiment will be omitted.

FIG. 9 is a block diagram showing the detailed arrangement of the individual noise removal module 104 that executes a noise removal process using the noise distribution method. Referring to FIG. 9, reference numeral 900 denotes an input terminal of parameters, which are determined by the parameter determination module 103 and are to be used in a pixel value selector 901 (to be described below). The pixel value selector 901 selects arbitrary ones of pixels which form a window on the basis of a pseudo random number generated by a random number generator 902, and the parameters input via the input terminal 900.

Reference numeral 903 denotes an input terminal of parameters, which are determined by the parameter determination module 103 and are to be used in a pixel value determination unit 904 (to be described below). The pixel value determination unit 904 determines a new pixel value of interest on the basis of the pixel of interest of the window unit 302, selected pixels selected by the pixel value selector 901, and the parameters input via the input terminal 903.

Figure 10:
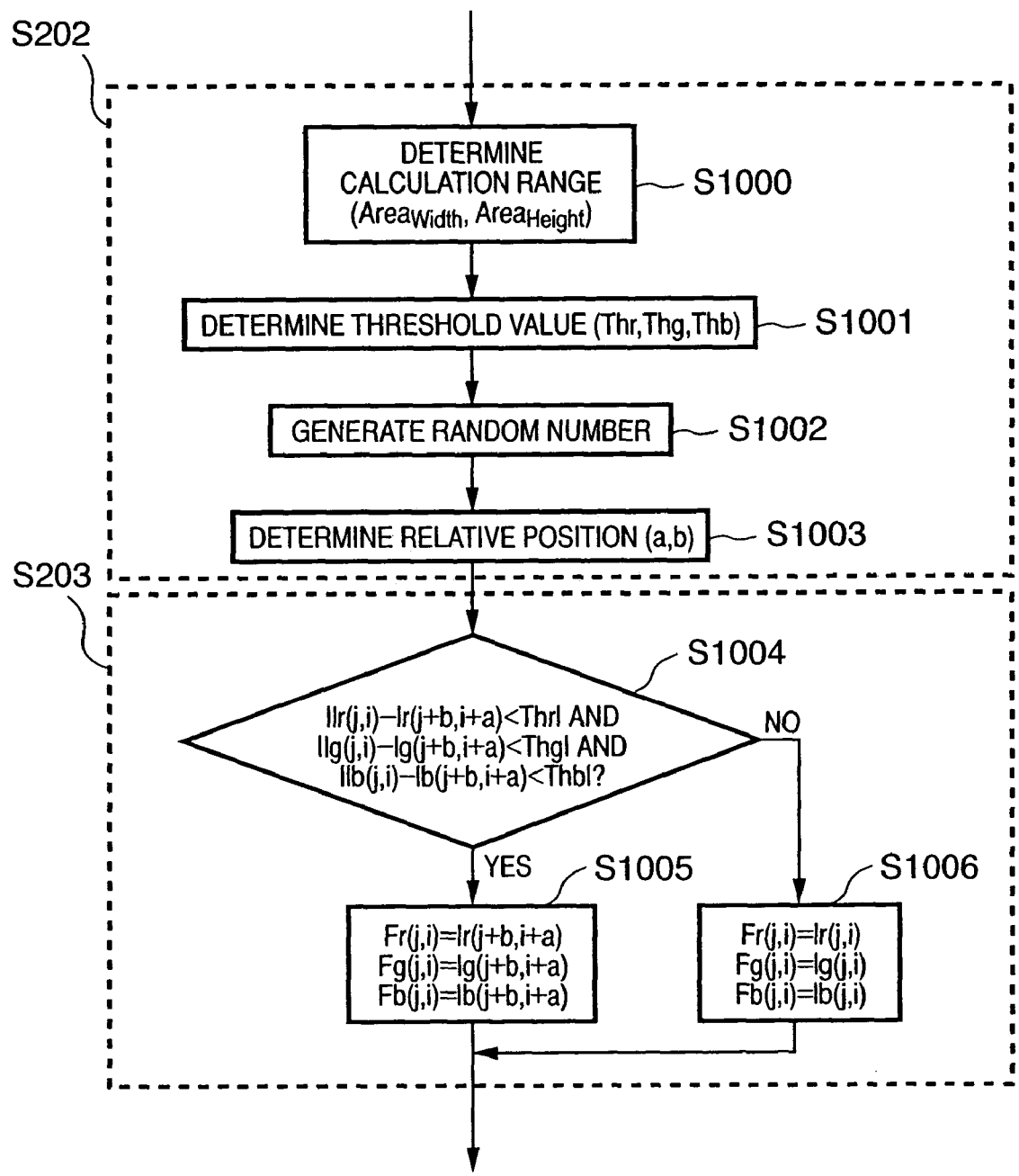
FIG. 10 is a flow chart for explaining the operation sequence of the individual noise removal module 104 when the arrangement shown in FIG. 9 is used.

FIG. 10 is a flow chart for explaining the operation sequence of the individual noise removal module 104 when the arrangement shown in FIG. 9 is used. In FIG. 10, ranges bounded by the broken lines respectively indicate the parameter determination process (step S202) used to process a region of interest, and the noise removal process (step S203) in the flow chart shown in FIG. 2, and steps before and after these steps in the flow chart of FIG. 2 are not shown.

The parameter determination module 103 determines a window size ($Area_{Width}$, $Area_{Height}$) on the basis of resolution information input via the input terminal 102 (step S1000). Then, the parameter determination module 103 determines various threshold values Thr, Thg, and Thb on the basis of the resolution information input via the input terminal 102 (step S1001).

The individual noise removal module 104 generates a random number (step S1002), and determines values a and b of the horizontal and vertical relative positions from the pixel of interest on the basis of the generated random number and the resolution information input via the input terminal 102 (step S1003). Upon determining values a and b, two random numbers may be independently generated, or two variables may be calculated by a random number which is generated once. Note that values a and b are determined not to exceed the window size determined in step S1000. For example, if the window size is 9×9 pixels having the pixel of interest as the center, values a and b are set using a remainder calculation based on the generated random number to fall within the ranges $-4 \leq a \leq 4$ and $-4 \leq b \leq 4$.

Using determined values a and b, and the threshold values determined in step S1001, the following comparison is made (step S1004) to see whether or not:

$|Ir(j, i) - Ir(j+b, i+a)| < Thr$ and $|Ig(j, i) - Ig(j+b, i+a)| < Thg$ and $|Ib(j, i) - Ib(j+b, i+a)| < Thb$ where Ir(j, i) is the pixel value of the R component, Ig(j, i) is the pixel value of the G component, and Ib(j, i) is the pixel value of the B component all of the pixel of interest located at a coordinate position (j, i). Also, Thr, Thg, and Thb are respectively R, G, and B threshold values determined in step S1001. Furthermore, |x| is the absolute value of x.

That is, it is determined in step S1004 whether or not the absolute values of the differences between three, R, G, and B component values of a selected pixel arbitrarily selected from the window, and those of the pixel of interest become smaller than the predetermined threshold values. If the comparison result in step S1004 is affirmative (Yes in step S1004), the selected pixel values substitutes new values of the pixel of interest (step S1005). If the comparison result in step S1004 is negative (No in step S1004), the old values of the pixel of interest are used as new values (step S1006). Hence, no substitution is made.

Note that different values for R, G, and B colors in an RGB color image may be determined as the parameters to be determined in steps S1000 and S1001. In this case, the noise distribution process in steps S1004 to S1005 executes processes using individual threshold values for individual ranges to be calculated for respective colors.

In this embodiment, R, G, and B components have been exemplified as image information. Alternatively, this embodiment may be applied to luminance and color difference components used in JPEG or the like, or complementary color components such as C, M, Y, and K components or the like used as ink colors in a printer or the like. As in the first embodiment mentioned above, parameters are determined in step S202 in the same operation sequence as that in the flow chart shown in FIG. 5, and the processes are selectively executed in accordance with the resolution information input via the input terminal 102.

The resolutions and the effects and adverse effects of the noise removal process will be described below.

Figure 11A:
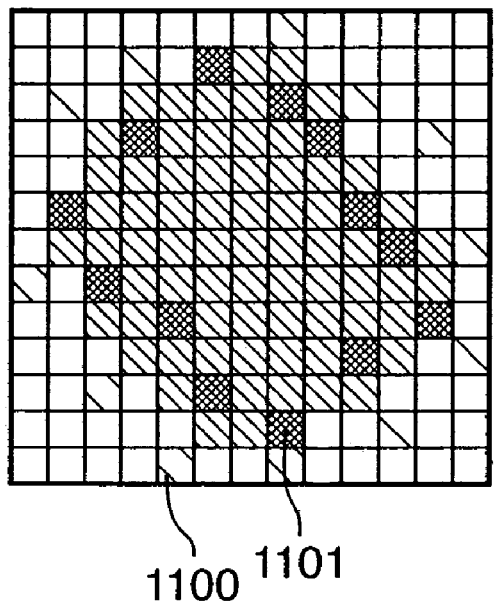
FIGS. 11A and 11B are views showing the relationship between noise produced in an image sensed by a digital camera shown in FIG. 6A, and the results of the noise distribution process.
Figure 11B:
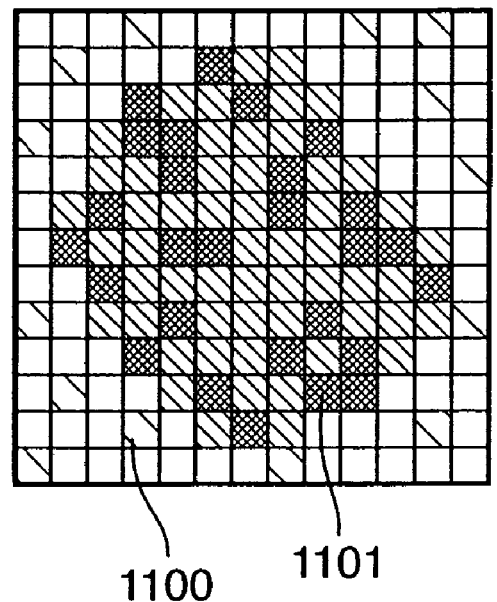

FIGS. 11A and 11B show the relationship between noise generated in an image sensed by a digital camera shown in FIG. 6A, and the results of the noise distribution process. In the following description, processing windows with sizes indicated by the regions 602 and 603 in FIG. 6B are used.

FIG. 11A shows an image state as a result of the noise distribution process which is executed using the 5×5 pixel window 602 as the processing range for the image in FIG. 6A.

Referring to FIG. 11A, reference numeral 1100 denotes pixels, which belonged to the non-noise region 601 before the process, but to which the pixel values of the noise region are distributed as a result of the noise distribution process. Reference numeral 1101 denotes pixels, which belonged to the noise region 600 before the process, but which are replaced by pixel values of the non-noise region 601 since the noise region is distributed as a result of the noise distribution process.

In FIG. 11A, since the processing region is smaller than the size of the noise region 600, the central portion of the noise region 600 undergoes a pixel substitution process within the noise region 600, and the obtained noise removal effect is insufficient.

On the other hand, FIG. 11B shows an image state as a result of the noise distribution process which is executed using the 9×9 pixel window 603 as the processing range for the image in FIG. 6A. In FIG. 11B, the process is done using the processing region which is large enough with respect to the size of the noise region 600. For this reason, the central portion of the noise region 600 undergoes pixel value substitution, and a cluster of noise components, which are readily visually detectable, are distributed, thus obtaining a noise removal effect.

Figure 12A:
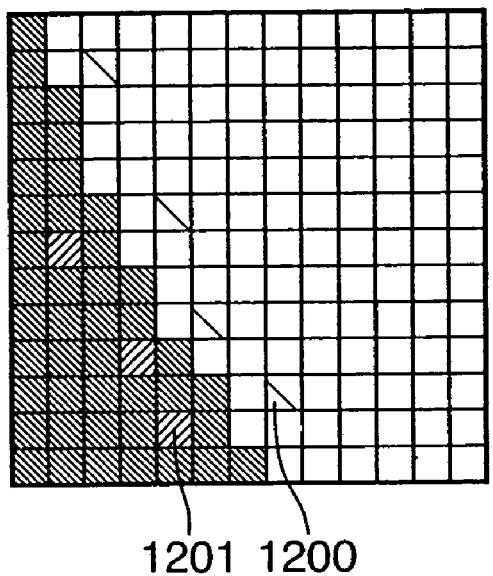
FIGS. 12A and 12B are views showing the relationship between an edge portion present in image information shown in FIG. 7A, and the results of the noise distribution process.
Figure 12B:
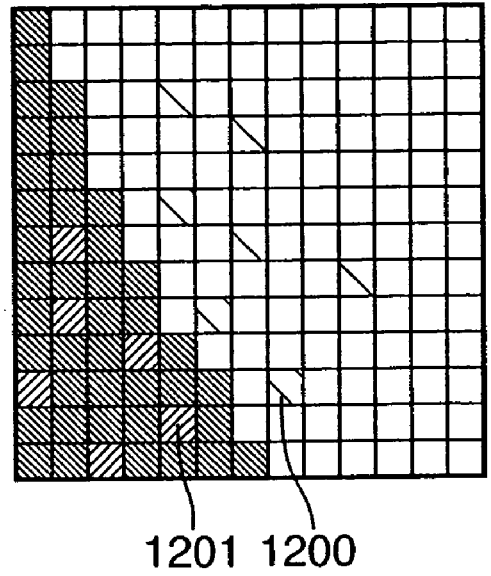

FIGS. 12A and 12B show the relationship between an edge portion present in image information shown in FIG. 7A, and the results of the noise distribution process. In the following description, processing windows with sizes indicated by the regions 602 and 603 in FIG. 6B are used. FIG. 12A shows an image state as a result of the noise distribution process which is executed using the 5×5 pixel window 602 as the processing range for the image in FIG. 7A.

In FIG. 12A, reference numeral 1200 denotes pixels, which belonged to the low-density region 700 before the process, but to which the pixel values of the high-density region 701 are distributed as a result of the process. Also, reference numeral 1201 denotes pixels, which belonged to the high-density region 701 before the process, but to which the pixel values of the low-density region 700 are distributed as a result of the process.

In FIG. 12A, since the processing window is relatively small, pixels are distributed only near the edge in the image region shown in FIG. 7A. On the other hand, FIG. 12B shows an image state as a result of the noise distribution process which is executed using the 9×9 pixel window 603 as the processing range for the image in FIG. 7A.

In FIG. 12B, since the processing window size is large, pixels are distributed even to pixels farther from the edge in the image region shown in FIG. 7A across the edge boundary. When pixels near the edge boundary are distributed over a broad range, the edge blurs, resulting in deterioration of the image quality. When the large processing range shown in FIG. 12B is applied to the image edge portion shown in FIG. 7A, the adverse effect of the process becomes visually conspicuous.

FIGS. 13A to 13H show the relationship between the threshold values used in the noise distribution process, and the processing results. FIG. 13A shows an image state of an original image. In FIG. 13A, reference numeral 1300 denotes an image region which includes a cluster of several pixels, and has pixel values different from those of a surrounding region. Reference numeral 1301 denotes a region which includes pixels around the region 1300 and has pixel values=20 as an example. Reference numeral 1302 denotes a region which includes pixels around the region 1300 and has pixel values=15 as an example.

FIG. 13B is a graph showing a change in pixel value. In FIG. 13B, the abscissa plots one line bounded by the bold frame in FIG. 13A, and the ordinate plots pixel values of pixels. FIG. 13C shows an example of a formula that expresses a pixel value substitution condition used in the noise distribution process. The formula shown in FIG. 13C uses a threshold value=8, and expresses that a pixel value is substituted if the absolute value of the difference between the pixel values of the pixel of interest and the selected pixel is equal to or smaller than 8.

FIG. 13D shows the result of the noise distribution process for FIG. 13A as an original image on the basis of the formula shown in FIG. 13C. In FIG. 13D, since the absolute values of the differences between the pixel values of pixels, which belong to the image regions 1300 and 1301 in FIG. 13A, become equal to or smaller than 8, pixel values are substituted. On the other hand, since the absolute values of the differences between the pixel values of pixels which belong to the image regions 1300 and 1302 become 10, no pixel value substitution is made.

FIG. 13E is a graph showing a change in pixel value. In FIG. 13E, the abscissa plots one line bounded by the bold frame in FIG. 13D. FIG. 13F shows an example of another formula that expresses a pixel value substitution condition used in the noise distribution process. In FIG. 13F, a threshold value=12 is used unlike in FIG. 13C.

FIG. 13G shows the result of the noise distribution process for FIG. 13A as an original image on the basis of the formula shown in FIG. 13F. In FIG. 13G, since not only the absolute values of the differences between pixel values of pixels which belong to the image regions 1300 and 1301 in FIG. 13A become equal to or smaller than 8, but also the absolute values of the differences between pixel values of pixels which belong to the image regions 1300 and 1302 become 10, i.e., the absolute values of the differences between the pixel values become smaller than the threshold value, pixel values are substituted.

FIG. 13H is a graph showing a change in pixel value. In FIG. 13H, the abscissa plots one line bounded by the bold frame in FIG. 13G. Upon comparison between FIGS. 13E and 13H as the results of the two different noise distribution processes, pixels on the left side of the graph in FIG. 13E undergo pixel value substitution, but those on the right side of the graph do not undergo pixel value substitution. That is, the shape of the original image near the image regions 1300 and 1302, which have the same condition as that on the right side of the graph, remains unchanged. When the image region 1300 is image information, image information of the noise removal process result is preferably less modified. In case of the example shown in FIG. 13D or 13E, the shape of the image region 1300 is not completely broken, and the adverse effect can be suppressed.

On the other hand, in FIG. 13H, pixel values are substituted irrespective of their horizontal positions, and the shape of the image region 1300 is broken. For this reason, when the image region 1300 is noise, the processing effect is visible.

The noise removal effects and adverse effects with respect to the processing ranges and threshold values in the noise distribution process have been explained using FIGS. 11A and 11B, FIGS. 12A and 12B, and FIGS. 13A to 13H. As has been explained in the first embodiment, the noise strength and visual conspicuity of the adverse effect after the process vary depending on the resolution upon outputting an image. For this reason, when the output resolution is high enough to visually obscure the adverse effect, the noise removal effect can be improved by setting parameters which broaden the processing range, those which set higher selection probabilities of pixel values for outer pixels within the window, those which set a higher threshold value, and so forth.

When the output resolution is low, visual conspicuity of the adverse effect due to the noise removal process can be suppressed by setting parameters, which narrow down the processing range, those which set higher selection probabilities of pixel values for pixels closer to the pixel of interest, those which set a lower threshold value, or the like.

In this embodiment, the processing ranges and threshold values have been exemplified as parameters to be changed. However, the present invention is not limited to such specific parameters. The determination rules of parameters with respect to the resolution are preferably determined in correspondence with the characteristics of image information output means.

As described above, according to the present invention, visual conspicuity of the adverse effect generated upon the noise removal process can be determined in correspondence with the output resolution. As a result, the noise removal process can be efficiently executed while suppressing the adverse effect of the noise removal process.

Third Embodiment

The first embodiment has exemplified a case wherein the noise removal process which can enhance its effect and can suppress its adverse effect is implemented by determining the processing ranges and weights used upon calculating the weighted mean on the basis of conspicuity of the adverse effect of the noise removal process depending on the output resolution in the noise removal process using an LPF.

Note that the present invention can be applied to cases other than those exemplified in the first and second embodiments. For example, the present invention can also be applied to an MF process that has been described above as a typical noise removal processing method. In a method using an MF, a median pixel value is selected from all pixel values within the processing range, and substitutes the pixel value of the pixel of interest. This method is particularly effective for spot noise which has very low correlation with surrounding pixels. In this embodiment as well, the same reference numerals denote the same items as those described above, and a description thereof will be omitted.

Figure 14:
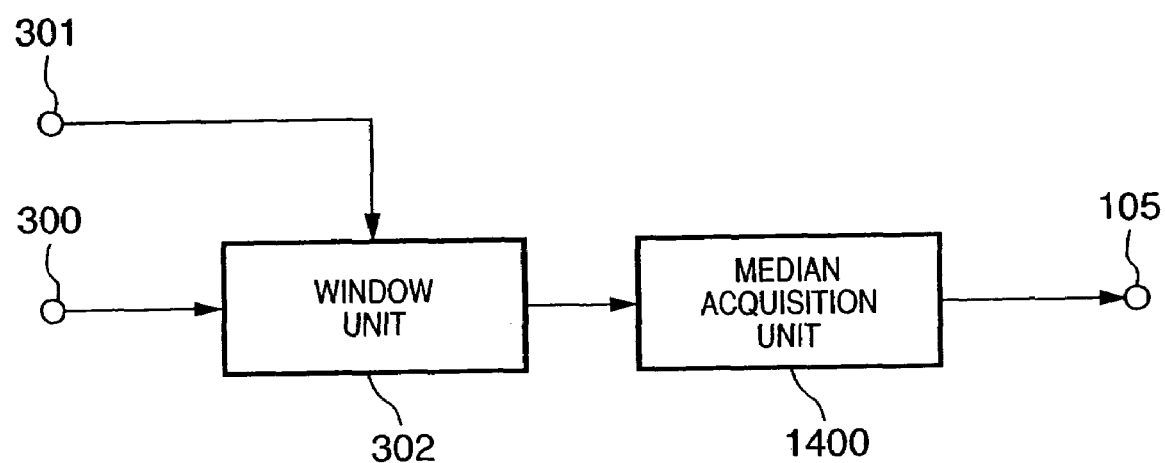
FIG. 14 is a block diagram showing the arrangement of principal part of the individual noise removal module 104 according to the third embodiment.

FIG. 14 is a block diagram showing the arrangement of principal part of the individual noise removal module 104 according to the third embodiment. In FIG. 14, a median acquisition unit 1400 acquires a median from the pixel values of all pixels in the processing range determined by the parameter determination module 103, and the median substitutes as a new pixel value of the pixel of interest.

Figure 15:
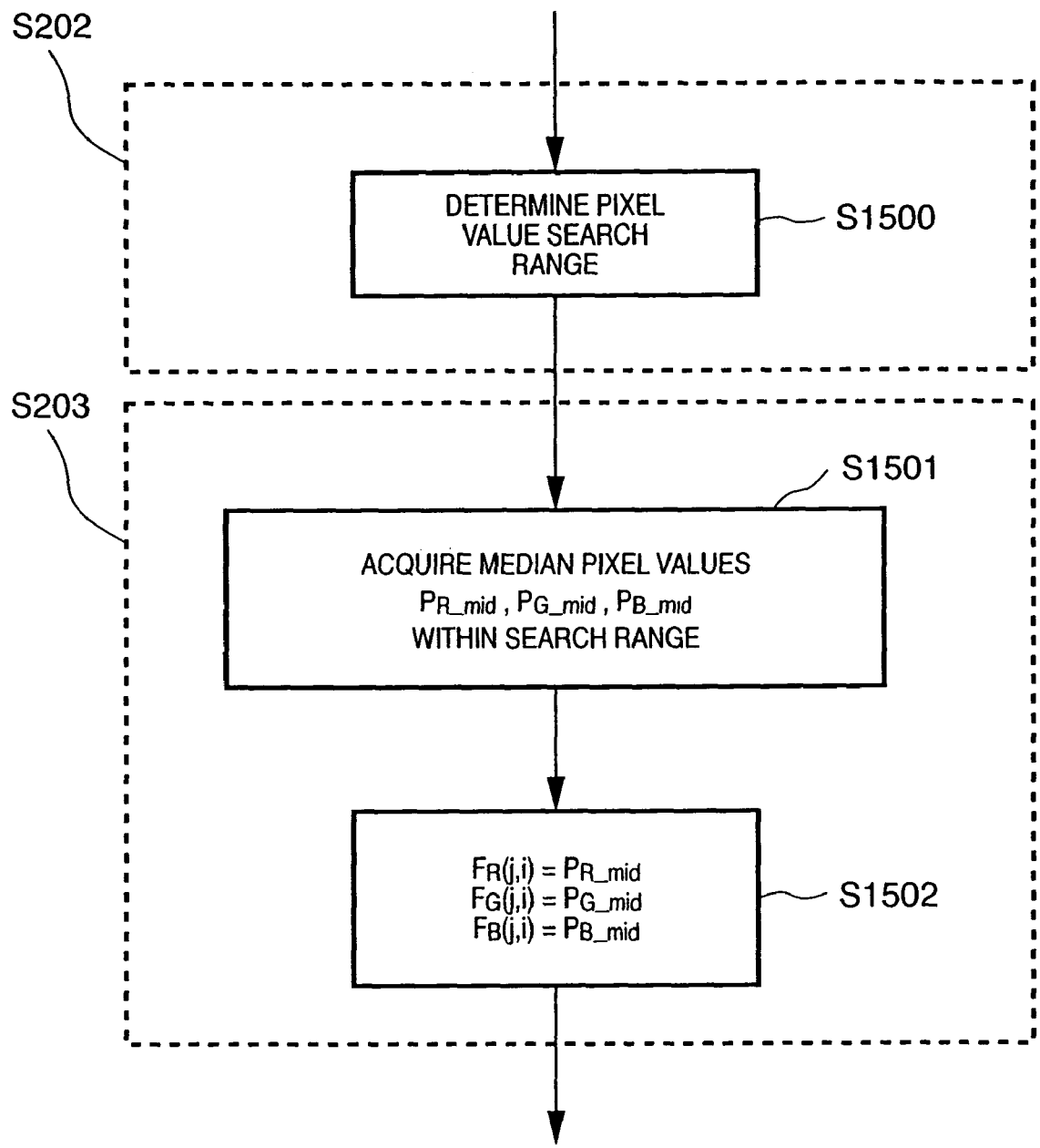
FIG. 15 is a flow chart for explaining the operation sequence of the individual noise removal module 104 shown in FIG. 14.

FIG. 15 is a flow chart for explaining the operation sequence of the individual noise removal module 104 shown in FIG. 14. FIG. 15 shows steps corresponding to steps S202 and S203 in the flow chart shown in FIG. 2.

A search range of a median pixel value is determined on the basis of the resolution information input via the input terminal 102 (step S1500). Medians $P_{R\_mid}$, $P_{G\_mid}$, and $P_{B\_mid}$ are acquired from pixel values present within the search range determined in step S1500 (step S1501). Furthermore, medians $P_{R\_mid}$, $P_{G\_mid}$, and $P_{B\_mid}$ acquired in step S1501 are set as new pixel values $F_R(j, i)$, $F_G(j, i)$, and $F_B(j, i)$ of the pixel of interest (step S1502), thus ending the flow of FIG. 15. The flow then advances to the next process.

Note that different values for R, G, and B colors in an RGB color image may be determined as the parameters to be determined in step S1500. In this case, the processes in steps S1501 and S1502 are executed using individual threshold values for individual ranges to be calculated for respective colors.

In this embodiment, R, G, and B components have been exemplified as image information. Alternatively, this embodiment may be applied to luminance and color difference components used in JPEG or the like, or complementary color components such as C, M, Y, and K components or the like used as ink colors in a printer or the like. As in the first embodiment mentioned above, parameters are determined in step S202 in the same operation sequence as that in the flow chart shown in FIG. 5, and the processes are selectively executed in accordance with the resolution information input via the input terminal 102.

When many noise components are produced and a narrow processing range is set, the MF process often selects a pixel value that shifts in the noise direction compared to those around the median pixel value near the original processing region as the median pixel value in the processing region. On the other hand, when a broad processing range is set, an edge gets into the processing region, and a desired median cannot often be obtained. Such adverse effects in the MF process are similar to those in the LPF process, and are visually recognized as blurs.

For this reason, parameters are preferably determined depending on whether or not a blur is visually conspicuous at the input output resolution. Based on the input output resolution information, if it is determined that the resolution is as high as the adverse effect is visually inconspicuous, the processing range is broadened; if it is determined that the resolution is as low as the adverse effect of the noise removal process is conspicuous, the processing range is narrowed down, thus implementing a noise removal process which can assure high noise removal effect and can suppress the adverse effect.

In another method, the MF process may be done only when the pixel value of interest is isolated compared to those of surrounding pixels. In such case, a threshold value used upon determining if the pixel value of interest is isolated may be changed in correspondence with the output resolution. Furthermore, execution of an adaptive process that executes the MF process only when the pixel of interest has an isolated pixel value may be changed in correspondence with the output resolution.

That is, the image processing apparatus according to the present invention is characterized in that the median acquisition unit 1400 removes noise using a median filter.

Fourth Embodiment

The first, second, and third embodiments described above have exemplified a case wherein various processing parameters are controlled to obtain desired effects and adverse effects of a noise reduction process by utilizing the fact that the conspicuity of the adverse effect of the noise removal process varies with respect to an effective scheme in the noise removal process in correspondence with the output resolution upon displaying or printing an image.

This embodiment will exemplify a case wherein a noise reduction process with a higher effect is implemented by combining the aforementioned noise removal processes on the basis of their features.

Figure 16:
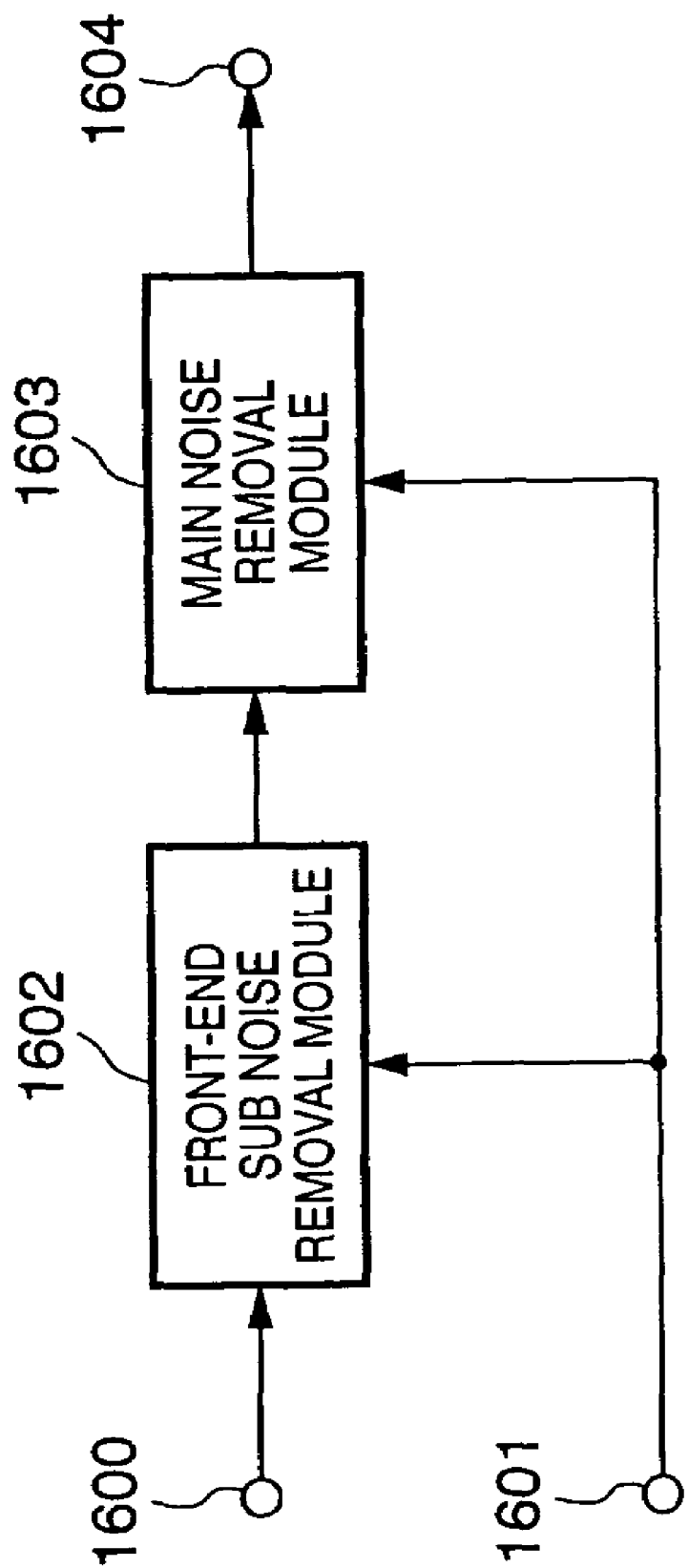
FIG. 16 is a block diagram showing the arrangement of principal part of an image processing apparatus according to the fourth embodiment.

FIG. 16 is a block diagram showing the arrangement of principal part of an image processing apparatus according to the fourth embodiment. Referring to FIG. 16, reference numeral 1600 denotes an input terminal for inputting image information, i.e., an image signal superposed with noise components. Reference numeral 1601 denotes an input terminal for inputting resolution information upon outputting the image information. Furthermore, a front-end sub noise removal module 1602 executes a noise removal process for improving the noise removal effect of a main noise removal module 1603 (to be described below). The main noise removal module 1603 executes a main noise removal process of this embodiment. On the other hand, reference numeral 1604 denotes an output terminal for outputting an image signal that has undergone the noise removal process.

In FIG. 16, the front-end sub noise removal module 1602 and main noise removal module 1603 respectively comprise the building components shown in FIGS. 1A and 1B, and the individual noise removal module 104 is implemented by combining any of FIGS. 3, 9, and 14 as the principal part block diagrams of the first, second, and third embodiments.

This embodiment will exemplify a case wherein the MF process described in the third embodiment is applied to the front-end sub noise removal module 1602, and the noise distribution method explained in the second embodiment is applied to the main noise removal unit 1603. Note that a flow chart showing the operation sequence of the apparatus shown in FIG. 16 is prepared by connecting those of the principal part block diagrams of the third and second embodiments in series, and a description thereof will be omitted.

That is, in the image processing apparatus according to the present invention, image data that contains noise which consists of main noise and sub-noise is input from the input terminal 1600. Main noise contained in the image data is removed by the main noise removal module. On the other hand, sub-noise contained in the image data is removed by the front-end sub noise removal module 1602. Image data from which noise has been removed is output from the output terminal 1604.

The image processing apparatus according to the present invention is characterized in that sub-noise disturbs a main noise removal process of the main noise removal module 1603, and a sub-noise removal process of the front-end sub noise removal module 1602 is executed prior to the main noise removal process of the main noise removal module 1603.

FIGS. 17A to 17D are schematic views for explaining the noise removal effect according to this embodiment. FIG. 17A shows image information superposed with noise components, i.e., two different types of noise. Reference numeral 1700 denotes noise which is visually conspicuous since a plurality of pixels having higher or lower pixel values than surrounding pixel values successively appear as a cluster. Reference numeral 1701 denotes spot noise which has a pixel value having low correlation with surrounding pixels. On an image input by a digital camera or the like, a plurality of different types of noise are often superposed together. The two different types of noise described in this embodiment correspond to typical types of noise superposed on image information sensed by a digital camera.

FIG. 17B shows the processing result obtained by applying the noise distribution method executed by the main noise removal module 1603 to the image shown in FIG. 17A. As has been described in the second embodiment, the noise distribution method does not substitute the pixel value of the pixel of interest, when the absolute value of the difference between the pixel values of the pixel of interest and selected pixel is large. Since spot noise has low correlation with surrounding pixel values, it often has a pixel value extremely different from surrounding pixel values. When many spot noise components 1701 are present, as shown in FIG. 17A, the probability of pixel value substitution lowers in the noise distribution method. As a result, the cluster noise 1700 that can be removed by the noise distribution method cannot often be sufficiently removed, as shown in FIG. 17B.

FIG. 17C shows the processing result obtained by applying the MF process to be executed by the front-end sub noise removal module 1602 to the image shown in FIG. 17A. Assume that the MF process of this embodiment is executed only when the pixel value of the pixel of interest is sufficiently different from those of surrounding pixels. In FIG. 17C, the spot noise 1701 is removed by the MF process, and only the cluster noise 1700 remains unremoved.

FIG. 17D shows the result obtained by further applying the noise distribution method to FIG. 17C. In FIG. 17D, the spot noise 1701 is removed, and the cluster noise 1700 is distributed, thus implementing effective noise removal.

In this embodiment, the MF process described in the third embodiment is applied as the front-end sub noise removal module 1602. Also, the LPF process described in the first embodiment similarly has an effect to remove spot noise. For this reason, the LPF process may be applied as the front-end sub noise removal module 1602 to obtain the same effect as in this embodiment.

As described above, the conspicuity of the adverse effects due to the noise reduction process depends on the output resolution. Hence, when a plurality of different noise removal processes are executed, the processing parameters are preferably switched for respective noise processes in correspondence with the conspicuity levels of the adverse effects due to the respective noise removal process at the input output resolution. Especially when the adverse effect is conspicuous, parameters may be determined to cancel execution of the process in the front-end sub noise removal module 1602 or main noise removal module 1603.

This embodiment has exemplified the noise removal process using the noise distribution method applied as the main noise removal module 1603, and the LPF or MF process applied as the front-end sub noise removal module 1602. However, the present invention is not limited to such specific embodiment, and is effective for a combination of noise removal methods that can improve the effect or can suppress the adverse effect by executing noise removal using another noise removal method in advance. Also, this embodiment has exemplified a case wherein only one front-end sub noise removal process is executed. When a large number of types of noise are superposed, a sub-noise removal process may be executed for each noise, and a plurality of different front-end sub noise removal processes may be executed in such case.

According to the present invention, upon executing a noise removal process of image information superposed with a plurality of different noise components, since the parameters of the removal methods suited to respective noise components are changed in correspondence with the output resolution, respective noise components can be effectively removed while suppressing their adverse effects. Also, since a plurality of different noise removal methods are combined, noise components can be effectively removed from image information superposed with a plurality of different noise components.

Fifth Embodiment

The fourth embodiment described above has exemplified a case wherein the sub-noise removal process that improves the effect of the main noise removal process is executed before the main noise removal process. This embodiment will exemplify a case wherein a back-end sub noise removal process that suppresses adverse effects is executed in combination after execution of the main noise removal process, so as to further suppress the adverse effects produced as a result of the main noise removal process.

Figure 18:
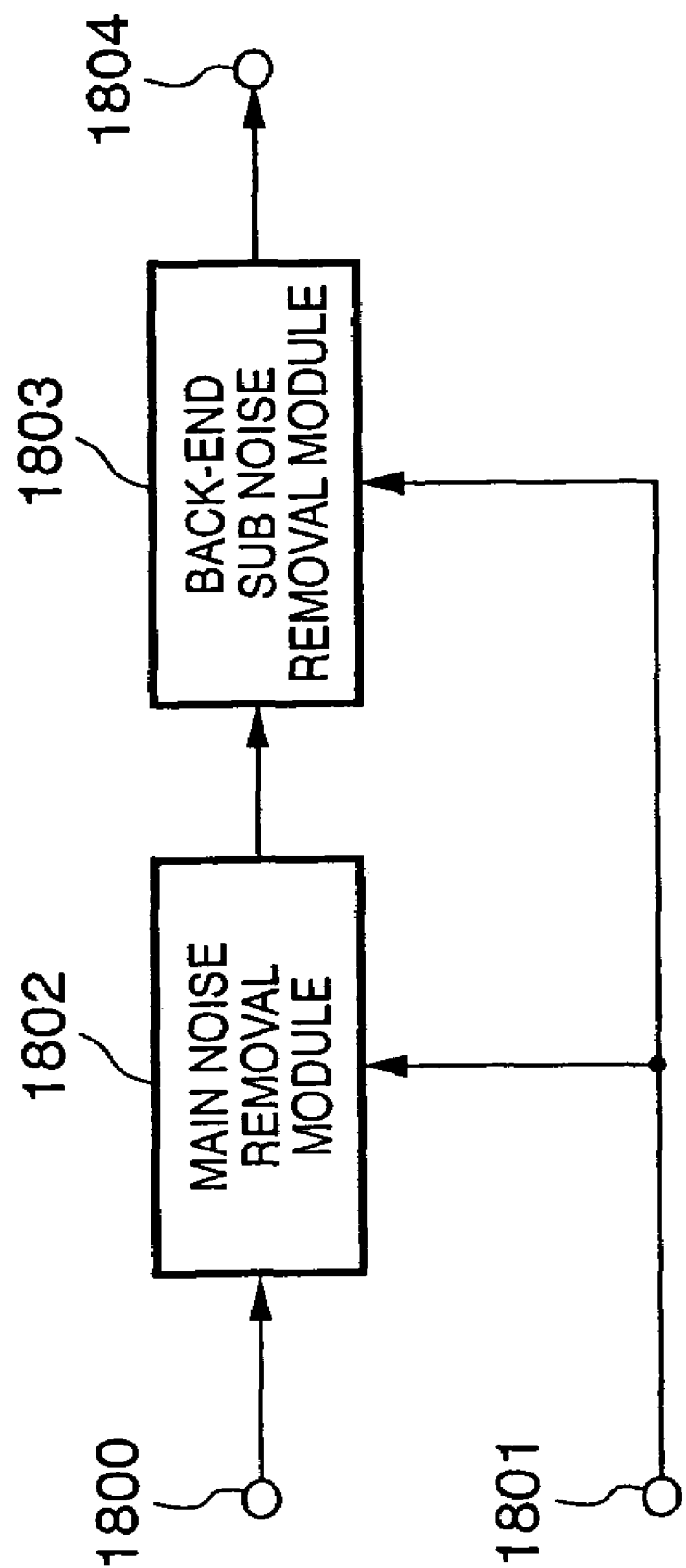
FIG. 18 is a block diagram showing the arrangement of principal part of an image processing apparatus according to the fifth embodiment of the present invention.

FIG. 18 is a block diagram showing the arrangement of principal part of an image processing apparatus according to the fifth embodiment of the present invention. Referring to FIG. 18, reference numeral 1800 denotes an input terminal for inputting image information, i.e., an image signal superposed with noise components. Reference numeral 1801 denotes an input terminal for inputting resolution information upon outputting the image information. On the other hand, a main noise removal module 1802 executes a main noise removal process of this embodiment. Also, a back-end sub noise removal module 1803 executes a process for suppressing adverse effects produced as a result of the process of the main noise removal module 1802. Also, reference numeral 1804 denotes an output terminal for outputting an image signal that has undergone the noise removal process.

In FIG. 18, the main noise removal module 1802 and back-end sub noise removal module 1803 respectively comprise the building components shown in FIGS. 1A and 1B, and the individual noise removal module 104 is implemented by combining any of FIGS. 3, 9, and 14 as the principal part block diagrams of the first, second, and third embodiments. In this embodiment, especially, the noise distribution method explained in the second embodiment is applied to the main noise removal unit 1802, and the LPF process described in the first embodiment is applied to the back-end sub noise removal module 1803. Note that a flow chart showing the operation sequence of the apparatus shown in FIG. 18 is prepared by connecting those of the principal part block diagrams of the first and second embodiments in series, and a description thereof will be omitted.

That is, in the image processing apparatus according to the present invention, image data that contains noise is input from the input terminal 1800. Noise contained in the image data is removed by the main noise removal module 1802, and new noise produced by the noise removal process of the main noise removal module 1802 is removed by the back-end sub noise removal module 1803. Image data from which the noise and new noise have been removed by the main noise removal module 1802 and the back-end sub noise removal module 1803 is output from the output terminal 1804.

The image processing apparatus according to the present invention is characterized in that the noise removal process of the main noise removal module 1802 is executed before the new noise removal process of the back-end sub noise removal module 1803.

FIGS. 19A to 19C are schematic views for explaining the noise removal effect according to this embodiment. FIG. 19A shows image information superposed with noise components. Reference numeral 1900 denotes a cluster noise region which is visually conspicuous since a plurality of pixels having higher pixel values than surrounding pixel values successively appear as a cluster. Reference numeral 1901 denotes a non-noise region other than the cluster noise region 1900 in FIG. 19A.

FIG. 19B shows the processing result obtained by executing the noise distribution method as the main noise removal module 1802 for the image shown in FIG. 19A. Reference numeral 1902 denotes noise component pixels as remaining or distributed pixel values of noise components. Reference numeral 1903 denotes non-noise component pixels as remaining or distributed pixel values of non-noise components. In FIG. 19B, cluster noise components are distributed, and are hardly visually conspicuous, thus obtaining a certain noise removal effect.

However, when a relatively high threshold value, which is used to determine the pixel values of the noise distribution method in the main noise removal module 1802, is set to improve the effect of the noise process, granularity often becomes conspicuous. In recent years, application software or a printer driver often executes an image process such as a color appearance correction process or saturation up process that changes pixel values. When only the main noise removal module 1802 executes the noise removal process, the image shown in FIG. 19B is output. When the image shown in FIG. 19B undergoes the image process that changes pixel values, the differences between the noise component pixels 1902 and non-noise component pixels 1903 increase as a result of the process, thus producing granularity on the entire image.

FIG. 19C shows the result of the LPF process by the back-end sub noise removal module 1803 for the image shown in FIG. 19B. In FIG. 19C, a smooth image is obtained since it has smaller differences between the noise component pixels 1902 and non-noise component pixels 1903 than those of the image shown in FIG. 19B. For this reason, even when the image shown in FIG. 19C undergoes the image process that changes pixel values, production of the granularity is suppressed.

The granularity is more likely to be visually recognized depending on the resolution upon displaying or printing an image. Hence, when the granularity is visually conspicuous in correspondence with the output resolution, parameters are determined to strongly apply the process of the back-end sub noise removal module 1803, thus suppressing the adverse effect caused by the main noise removal module 1802. When the parameters that execute a process for strongly suppressing the adverse effect are set in the back-end sub noise removal module 1803, a relatively high threshold value used to determine pixel value substitution in the noise distribution method is set, so that substitution takes place easily, thereby also improving the noise removal effect.

On the other hand, in case of the output resolution at which the granularity is visually inconspicuous, parameters are set to weakly apply the process of the back-end sub noise removal module 1803, thereby suppressing the adverse effect of the whole noise removal process. Also, in case of the output resolution at which the differences between the pixel values of the noise component pixels 1902 and non-noise component pixels 1903 are sufficiently small, or they are visually inconspicuous, parameters may be determined to cancel the process of the back-end sub noise removal module 1803. When noise itself is inconspicuous, parameters may be determined to weakly apply or cancel the process of the main noise removal module 1802.

This embodiment has exemplified a case wherein the LPF process described in the first embodiment is applied as the back-end sub noise removal module 1803. Alternatively, the MF process described in the third embodiment can similarly provide the removal effect of spot noise. For this reason, when the MF process is applied as the back-end sub noise removal module 1803, the same effect as in this embodiment can be obtained.

This embodiment has exemplified a case wherein the noise removal process using the noise distribution method is applied as the main noise removal module 1802, and the LPF or MF process is applied as the back-end sub noise removal module 1803. However, the present invention is not limited to such specific embodiment, and is effective for various combinations of noise removal methods in which one noise removal method causes an adverse effect, and another noise removal method suppresses the adverse effect. Also, this embodiment has exemplified a case wherein only one back-end sub noise removal process is executed. However, when a plurality of adverse effects with different characteristics are produced, a plurality of back-end sub noise removal processes may be used.

According to the present invention, upon executing a noise removal process of image information superposed with noise components, the adverse effect caused by the noise removal process can be further suppressed by combining a plurality of noise removal methods.

Sixth Embodiment

The fourth embodiment has exemplified a case wherein the effect of the main noise removal process is improved by executing the front-end sub noise removal process before the main noise removal process. The fifth embodiment has exemplified a case wherein the adverse effect of the main noise removal process is suppressed by executing the back-end sub noise removal process after the main noise removal process. On the other hand, when a plurality of combinations of a plurality of noise removal methods described in the fourth and fifth embodiments are used, the effects of both the embodiments can be simultaneously obtained. Hence, this embodiment will exemplify a case wherein the combinations of the noise removal methods described in the fourth and fifth embodiments are further combined.

Figure 20:
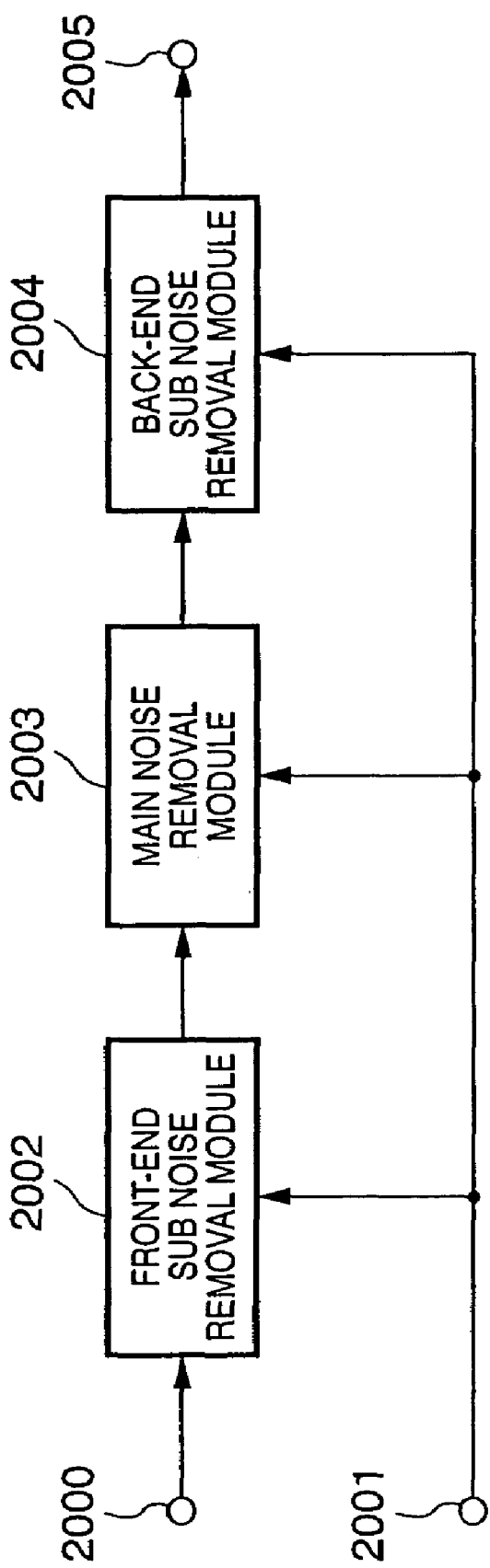
FIG. 20 is a block diagram showing the arrangement of principal part of an image processing apparatus according to the sixth embodiment of the present invention.

FIG. 20 is a block diagram showing the arrangement of principal part of an image processing apparatus according to the sixth embodiment of the present invention. Referring to FIG. 20, reference numeral 2000 denotes an input terminal for inputting image information, i.e., an image signal superposed with noise components. Reference numeral 2001 denotes an input terminal for inputting resolution information upon outputting the image information. Note that a front-end sub noise removal module 2002 executes a noise removal process for improving the noise removal effect of a main noise removal module 2003 (to be described below). The main noise removal module 2003 executes a main noise removal process of this embodiment. A back-end sub noise removal module 2004 executes a process for suppressing adverse effects produced as a result of the process of the main noise removal module 2003. Also, reference numeral 2005 denotes an output terminal for outputting an image signal that has undergone the noise removal process.

FIG. 20 shows the block diagram as a combination of FIGS. 16 and 18, and a flow that shows the processing sequence of this apparatus is implemented by serially executing the processing flows of FIGS. 16 and 18 while the process of the main noise removal module 2003 remains the same.

The process of this embodiment is a combination of the fourth and fifth embodiments, and the effects of both these embodiments can be obtained at the same time. That is, according to the present invention, the effect of the main noise process can be improved, while the adverse effects caused by the main noise process can be suppressed.

That is, in the image processing apparatus according to the present invention, image data that contains noise which consisting of main noise and sub-noise is input from the input terminal 2000. Main noise contained in the image data is removed by the main noise removal module 2003 using predetermined parameters used in the noise removal process on the basis of the output condition upon outputting image data after noise is removed. Prior to this process, sub-noise, which is contained in the image data and disturbs the main noise removal process in the main noise removal module 2003, is removed by the front-end sub noise removal module 2002. Furthermore, new noise produced by the noise removal process of the main noise removal module 2003 is removed by the back-end sub noise removal module 2004. Then, image data after the noise and new noise have been removed is output from the output terminal 2005.

Seventh Embodiment

In the first to sixth embodiments, parameters are determined on the basis of the resolution upon outputting image information. That is, the image processing apparatus according to the present invention is characterized in that the aforementioned output condition is information associated with a resolution upon outputting image data. As described above, the actual display size of unit pixels of image information sensed by a digital camera can be determined based on the resolution. By removing noise from input image data, the noise in the image data is visually reduced. That is, the present invention is characterized in that noise removal is visual reduction of noise contained in image data.

Normally, the image size upon output is settled only after the number of pixels and resolution of an input image are determined. However, when the resolution is fixed in advance, the image size can be determined by the enlargement ratio of an input image. Not only application software prevalently adopts enlargement ratio display, but also a copying machine, printer, or the like uses the enlargement ratio upon determining the output size. As described above, the enlargement ratio is prevalently used upon determining the image size. In such case, the arrangements described in the first to sixth embodiments may determine parameters on the basis of the enlargement ratio. That is, the image processing apparatus according to the present invention is characterized in that the aforementioned output condition is information associated with an enlargement ratio upon outputting image data.

Furthermore, when the output resolution and the number of pixels of an image upon output are known or can be estimated like in a full-screen display mode, borderless print mode, or the like, parameters may be determined on the basis of the number of pixels of the input image. That is, the image processing apparatus according to the present invention is characterized in that the aforementioned output condition is information associated with the number of pixels upon outputting image data.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit. When the present invention is applied to the recording medium, that recording medium stores the program codes corresponding to the aforementioned flow charts.

When the present invention is applied to the recording medium, that recording medium stores program codes corresponding to the aforementioned flow charts.

As described above, according to the present invention, noise removal process parameters can be controlled on the basis of conspicuity of the adverse effect of the noise removal process depending on the output resolution. As a result, conspicuous noise can be effectively removed from an image signal superposed with noise while suppressing deterioration of image information.

According to the present invention, when noise removal process parameters are controlled on the basis of conspicuity of noise depending on the output resolution upon using a plurality of noise removal processes in combination, the noise removal processes can be done more effectively.

Furthermore, according to the present invention, when noise removal process parameters are controlled on the basis of conspicuity of noise depending on the output resolution upon using a plurality of noise removal processes in combination, the adverse effects caused by the noise removal process can be effectively suppressed.

As described above, according to the present invention, conspicuous noise contained in image data can be effectively removed while suppressing deterioration of image information.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
an image input unit adapted to input image data;
a unit for inputting a designated quality of output image data;
a parameter determination unit for determining a first parameter on the basis of the designated quality;
a first noise removal unit adapted to remove noise contained in the image data using the determined first parameter; and
an output unit adapted to output image data after the first noise has been removed,
wherein said first noise removal unit comprises:
a designation unit adapted to designate a region of the image data including of a pixel of interest and pixels around the pixel;
a selection unit adapted to select in the region an arbitrary pixel to be used for comparing with the pixel of interest using pseudorandom numbers;
a pixel value determination unit adapted to determine a new pixel value of the pixel of the interest by using a pixel value of the selected pixel, when a difference between the pixel value of the pixel of interest and the arbitrary pixel is less than a predetermined value;
a substitution unit adapted to substitute the pixel value of the pixel of interest by the new pixel value to generate new image data; and
a second noise removal unit which removes spot-type noise contained in the image data and has low correlation with surrounding pixel values, wherein said second noise removal unit removes spot-type noise before said first noise removal means removes noise.

2. An image processing apparatus comprising:
an image input unit adapted to input image data;
a unit for inputting a designated quality of output image data;
a parameter determination unit for determining a first parameter on the basis of the designated quality;
a first noise removal unit adapted to remove noise contained in the image data using the determined first parameter; and
an output unit adapted to output image data after the first noise has been removed,
wherein said first noise removal unit comprises:
a designation unit adapted to designate a region of the image data including of a pixel of interest and pixels around the pixel;
a selection unit adapted to select in the region an arbitrary pixel to be used for comparing with the pixel of interest using pseudorandom numbers;
a pixel value determination unit adapted to determine a new pixel value of the pixel of the interest by using a pixel value of the selected pixel, when a difference between the pixel value of the pixel of interest and the arbitrary pixel is less than a predetermined value;
a substitution unit adapted to substitute the pixel value of the pixel of interest by the new pixel value to generate new image data; and
a second noise removal unit which removes spot-type noise resulting from noise removal processing performed by said first noise removal unit, wherein said second noise removal unit removes spot-type noise after said first noise removal unit removes noise.

3. An image processing apparatus comprising:
an image input unit adapted to input image data;
a unit for inputting a designated quality of output image data;
a parameter determination unit for determining a first parameter on the basis of the designated quality;
a first noise removal unit adapted to remove noise contained in the image data using the determined first parameter; and
an output unit adapted to output image data after the first noise has been removed,
wherein said first noise removal unit comprises:
a designation unit adapted to designate a region of the image data including of a pixel of interest and pixels around the pixel;
a selection unit adapted to select in the region an arbitrary pixel to be used for comparing with the pixel of interest using pseudorandom numbers;
a pixel value determination unit adapted to determine a new pixel value of the pixel of the interest by using a pixel value of the selected pixel, when a difference between the pixel value of the pixel of interest and the arbitrary pixel is less than a predetermined value;
a substitution unit adapted to substitute the pixel value of the pixel of interest by the new pixel value to generate new image data; and
a second noise removal unit which removes spot-type noise contained in said image data and has low correlation with surrounding pixel values and a third noise removal unit which removes spot-type noise resulting from noise removal processing performed by said first noise removal unit, wherein said second noise removal unit removes spot-type noise before said first noise removal unit removes noise, and said third noise removal unit removes spot-type noise after said first noise removal unit removes noise.

4. An image processing method comprising:
an image input step of inputting image data;
a step of designating a quality of output image data;
a first noise removal step of removing noise contained in the image data using a predetermined parameter;
a parameter determination step of determining the parameter on the basis of the designated quality; and
an output step of outputting image data after the noise has been removed
wherein said first noise removal step comprises:
a designation step of designating a region consisting of a pixel of interest and pixels around the pixel of the image data;

a selection step of selecting in the region an arbitrary pixel to be used for comparing with the pixel of interest using pseudorandom numbers;

a pixel value determination step of determining a new pixel value of the pixel of the interest on the basis of a pixel value of the selected pixel, when a difference between the pixel value of the pixel of interest and the arbitrary pixel is less than a predetermined value; d a substitution step of substituting the pixel value of the pixel of interest by the new pixel value to generate a new image data; and a second noise removal step which removes spot-type noise which is contained in the image data and has low correlation with surrounding pixel values, wherein said second noise removal step removes spot-type noise before said first noise removal step removes noise.

5. An image processing method comprising:

an image input step of inputting image data;

a step of designating a quality of output image data;

a first noise removal step of removing noise contained in the image data using a predetermined parameter;

a parameter determination step of determining the parameter on the basis of the designated quality; and an output step of outputting image data after the noise has been removed wherein said first noise removal step comprises:

a designation step of designating a region consisting of a pixel of interest and pixels around the pixel of the image data;

a selection step of selecting in the region an arbitrary pixel to be used for comparing with the pixel of interest using pseudorandom numbers;

a pixel value determination step of determining a new pixel value of the pixel of the interest on the basis of a pixel value of the selected pixel, when a difference between the pixel value of the pixel of interest and the arbitrary pixel is less than a predetermined value; d a substitution step of substituting the pixel value of the pixel of interest by the new pixel value to generate a new image data; and a second noise removal step which removes spot-type noise resulting from noise removal processing performed by said first noise removal step, wherein said second noise removal step removes spot-type noise after said noise removal step removes noise.

6. An image processing method comprising:

an image input step of inputting image data;

a step of designating a quality of output image data;

a first noise removal step of removing noise contained in the image data using a predetermined parameter;

a parameter determination step of determining the parameter on the basis of the designated quality; and an output step of outputting image data after the noise has been removed wherein said first noise removal step comprises:

a designation step of designating a region consisting of a pixel of interest and pixels around the pixel of the image data;

a selection step of selecting in the region an arbitrary pixel to be used for comparing with the pixel of interest using pseudorandom numbers;

a pixel value determination step of determining a new pixel value of the pixel of the interest on the basis of a pixel value of the selected pixel, when a difference between the pixel value of the pixel of interest and the arbitrary pixel is less than a predetermined value; d a substitution step of substituting the pixel value of the pixel of interest by the new pixel value to generate a new image data; and a second noise removal step which removes spot-type noise which is contained in said image data and has low correlation with surrounding pixel values and a third noise removal step which removes spot-type noise resulting from noise removal processing performed by said first noise removal step, wherein said second noise removal step removes spot-type noise before said first noise removal step removes noise, and said third noise removal step removes spot-type noise after said first noise removal step removes noise.

* * * * *